SYSTEM FOR ADJUSTING AMPLIFIERS

Filed Oct. 22, 1951 9 Sheets-Sheet 1

INVENTOR.
ALBERT J. WILLIAMS JR
BY
Woodcock and Phelan
ATTORNEYS

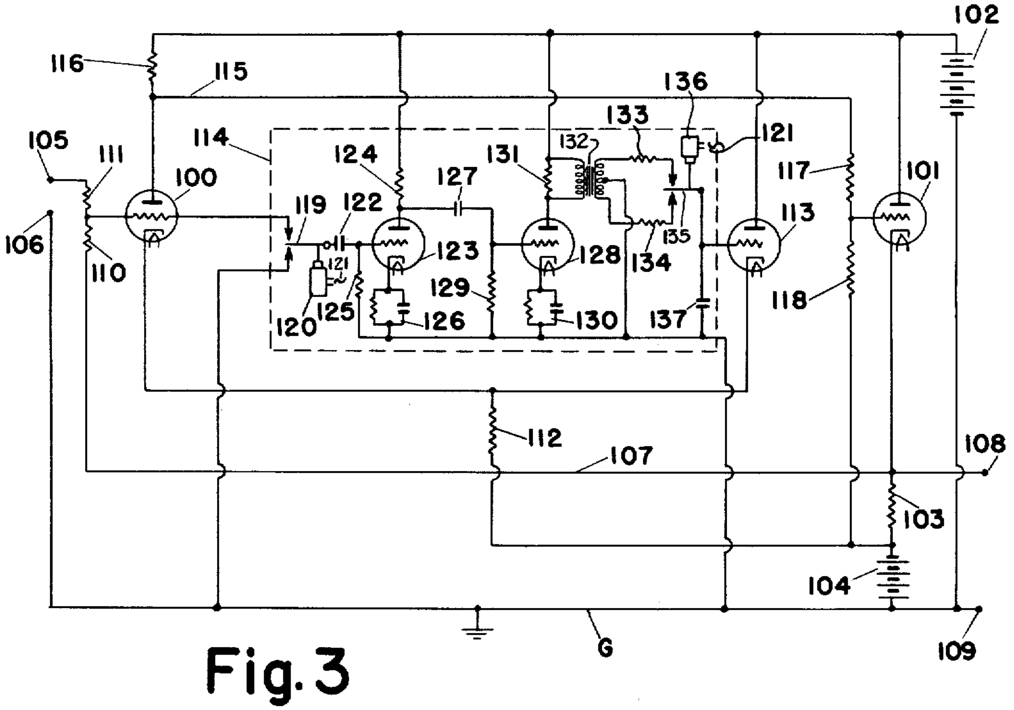
Fig. 3
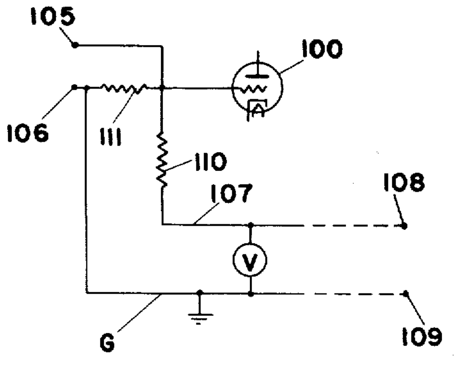
Fig. 3-A
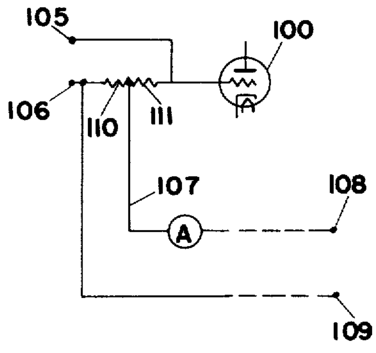
Fig. 3-B
INVENTOR.
ALBERT J. WILLIAMS JR.
BY
Woodcock and Phelan
ATTORNEYS INVENTOR.
ALBERT J. WILLIAMS, JR.
BY
Woodcock and Phelan
ATTORNEYS INVENTOR.
ALBERT J. WILLIAMS, JR.
BY
Woodcock and Phelan
ATTORNEYS INVENTOR.
ALBERT J. WILLIAMS JR.
BY
Woodcock and Phelan
ATTORNEYS INVENTOR.
ALBERT J. WILLIAMS JR.
BY
Woodcock and Phelan
ATTORNEYS Dec. 29, 1959 A. J. WILLIAMS, JR 2,919,409

SYSTEM FOR ADJUSTING AMPLIFIERS

Filed Oct. 22, 1951 9 Sheets-Sheet 7

*INVENTOR.*
ALBERT J. WILLIAMS JR.
*BY*
Woodcock and Phelan
ATTORNEYS

INVENTOR.
ALBERT J. WILLIAMS JR.
BY
Woodcock and Phelan
ATTORNEYS

INVENTOR.
ALBERT J. WILLIAMS JR.
BY
Woodcock and Phelan
ATTORNEYS

United States Patent Office 2,919,409

Patented Dec. 29, 1959

2,919,409

SYSTEM FOR ADJUSTING AMPLIFIERS

Albert J. Williams, Jr., Philadelphia, Pa., assignor to Leeds and Northrup Company, Philadelphia, Pa., a corporation of Pennsylvania Application October 22, 1951, Serial No. 252,433

33 Claims. (Cl. 330—9)

Figure 1:
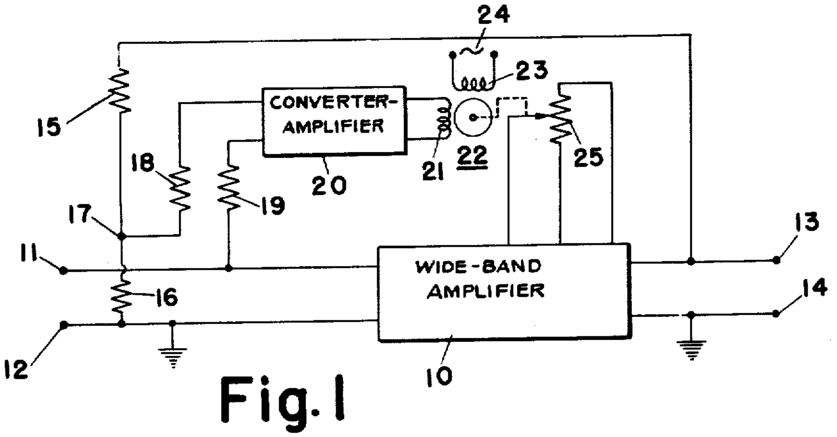

This invention relates to amplifiers and has for an object the provision of a method of and means for correcting for zero drift of the amplifier as by applying a corrective signal to the amplifier, upon deviation from a predetermined relationship of the output signal with respect to the input signal, to return operation of the amplifier to a predetermined characteristic curve, preferably one which passes through zero. The invention is particularly applicable to conductively-coupled amplifiers provided with negative feedback and greatly reduces the stability requirements of the power supplies therefor.

Those skilled in the art have long been aware of the problem of zero drift of an amplifier. Such zero drift may result from slow changes in the characteristics of the tubes; they also may be due to disturbances of an electrical, magnetic, mechanical or thermal nature. For example, variation in cathode temperature will cause a change in the zero of the amplifier which changes the output of the amplifier independently of the input as will also the production of thermal electric voltages, due to the use of different metals in the amplifier circuit. If there be an output signal with zero input signal, it will be recognized at once that such an amplifier will be undesirable for many applications, particularly in measuring systems.

The problem of zero drift has heretofore been so great that those skilled in the art have resorted to transformer-coupled or capacitively-coupled amplifiers, the alternating-current signals applied thereto and taken therefrom being unaffected by zero drift, the non-conductive coupling being effective to eliminate zero drift by the absence therein of a direct-current path. Such amplifiers have required the use of vibrators or other circuit-carrying means to convert direct-current signals to alternating-current signals for signal-transfer through non-conductive couplings, and have in many cases required the reconversion or rectification of the alternating-current to direct-current signals as by synchronous vibrators or grid controlled rectifiers.

In such amplifiers, particularly as applied to the measurement of small input signals, it has also been important to provide gain stability in order that the output signal shall always bear a predetermined relationship with respect to the input signal. The problem of gain stability has been satisfactorily solved by providing negative feedback with the forward gain of the amplifier sufficiently large that the product of the forward gain multiplied by the ratio of the negative feedback signal to the output signal is very large compared with unity. While amplifiers of the foregoing type have been entirely satisfactory, they have necessarily been limited in frequency response to that imposed by the modulation frequency of the vibrator or other type of converter. On the other hand, conductively-coupled amplifiers, so useful for wide band amplification purposes, have heretofore been subject to zero drift, notwithstanding provision of stabilized power supplies and other precautionary measures.

In accordance with the present invention, there is provided a wide-band, conductively-coupled amplifier which has both gain stability and zero stability, which is highly useful for amplification of direct-current signals, and which is not limited by the employment of synchronous converters and the like to a narrow frequency band or range. In carrying out the invention in one form thereof, there is established in a control circuit a predetermined relationship between the magnitude of the output signal and the magnitude of the input signal for amplifier operation such that with zero input there is zero output. Upon deviation in that predetermined relationship the magnitude of the output signal is automatically modified to reestablish the predetermined relationship without interrupting operation of the amplifier under the control of the input signal. While the invention is particularly useful to overcome zero drift, it may be applied for other purposes in response to change in the selected predetermined relationship established between the input and output signals.

By continuously modifying the output signal upon deviation of said predetermined relationship, the operation of the amplifier is predetermined and may be maintained in accordance with a characteristic curve passing through zero. There is no interruption in operation of the amplifier, and there is assurance that the output signal is free of error due to zero drift or to departure of the output from a predetermined relationship with respect to the input.

In a preferred form of the invention, the signals to be amplified are applied to a wide-band conductively-coupled amplifier having a control circuit in which a fraction of the output signal is compared with the input signal so that with zero input there is across said circuit a predetermined potential difference, preferably zero. Said potential difference is applied to a non-conductively coupled type of amplifier in which there is no zero drift. Upon variation of said potential difference from its predetermined value, the output of the non-conductively coupled amplifier is utilized to adjust the output of the conductively-coupled amplifier to return said output to its predetermined relation with the input signal of said conductively-coupled amplifier and to zero with zero input signal.

In one modification of the invention there is utilized an integrating circuit to integrate the changes in potential applied to the control circuit and to utilize the integrated signal for control of the adjustment of the output of the conductively-coupled amplifier. This arrangement is advantageous for many applications, particularly where it is desired to have maximum compensation for a small departure from zero which may continue over a substantial period of time.

The present invention has been found particularly useful for purposes other than the previously mentioned correction of zero drift, such as for alternating-current amplifiers including non-conductive couplings between stages to widen the frequency response or band width thereof. Where such an alternating-current amplifier is of the high-pass type, a control signal derived by a comparison of a fraction of the output signal with the input signal is utilized to control a separate amplifying channel for application to the amplifier of low-frequency components which are not passed therethrough. Obviously, the signals applied from the separate channel are applied to the amplifier at a stage following that in which occurs the attenuation of the low frequency.

The present invention is to be contrasted with the operation of a negative feedback amplifier in which the gain is stabilized by applying to the input circuit a predetermined fraction of the output signal to maintain constant the ratio between the input signal and the output signal. In the absence of zero drift the negative feedback achieves its purpose to a degree dependent upon the forward gain of the amplifier and the extent of application of negative feedback. An amplifier of the negative feedback type does not and cannot compensate for zero drift. For example, if the effect of zero drift as the same as an increase in the signal, the output will increase and the negative voltage fed back to the input circuit will likewise increase, by the same ratio as though an input signal were being applied to the amplifier. If the zero drift is due to a change within the amplifier itself, the error voltage (the difference between the applied voltage and the negative feedback voltage) may be in a sense opposite to the input signal and thereby substantially reduce the error signal or even reverse its polarity.

In contrast with the operation of a negative feedback amplifier, in accordance with the present invention there is derived from an amplifier, preferably though not necessarily of the negative feedback type, a control signal of reversible polarity dependent upon the direction of the difference between a fraction of the output signal and the input signal. That control signal is derived during application to the amplifier of an input signal of either polarity and the magnitude of the control signal will be dependent upon the size of the aforesaid difference between a fraction of the output signal and the input signal. The control signal is then utilized to control the application to the amplifier of a corrective signal whose magnitude and polarity is determined by the control signal and which acts upon the amplifier to reduce the aforesaid difference to a negligible value. The corrective signal is preferably derived from a separate amplifying channel of the alternating-current type, that is, one not subject to zero drift, but to which the control signal is applied.

By introducing the corrective signal into the amplifier during continued application thereto of the input signal to reduce the control signal to a negligibly small value, the objectives of the present invention are attained, which objectives cannot be attained with negative feedback amplifiers, namely, the operation of the direct-current amplifier without zero drift.

Figure 2:
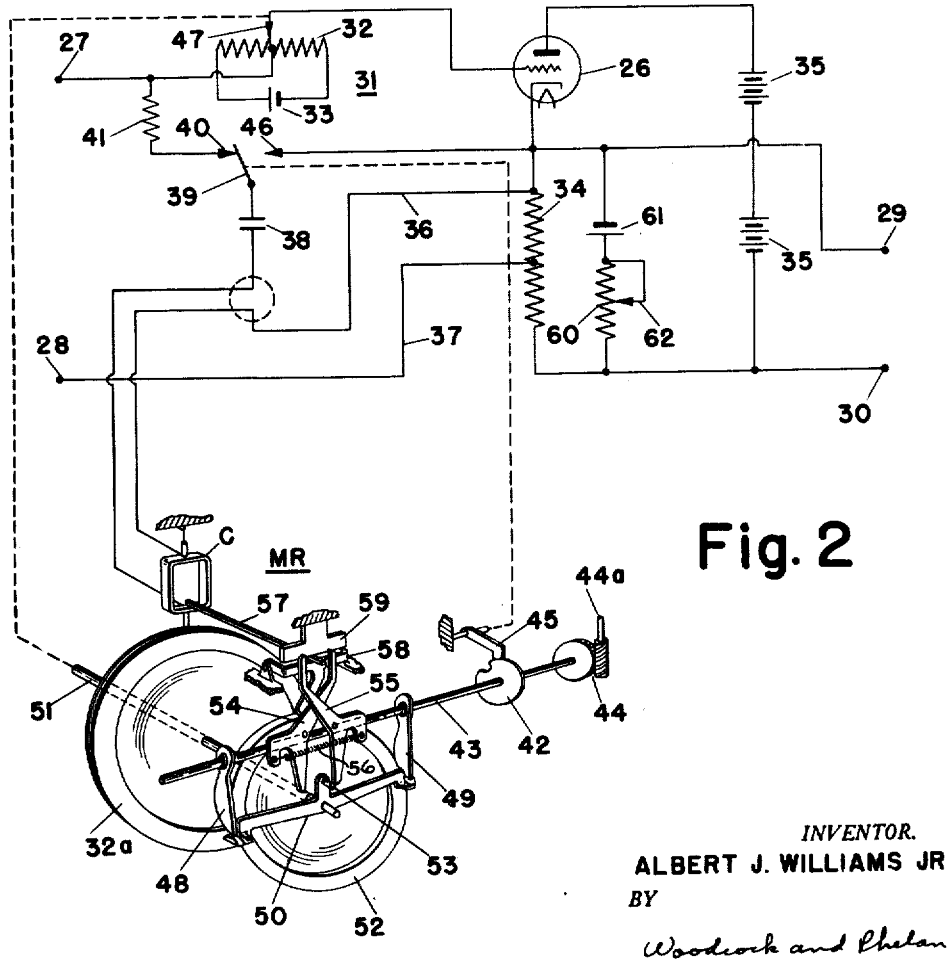

For a more detailed disclosure of the invention and for further objects and advantages thereof, reference is to be had to the following description taken in conjunction with the accompanying drawings, in which:

Fig. 1 illustrates in simple block diagram a system embodying the invention;

Fig. 2 diagrammatically illustrates a conductively coupled amplifier with an associated electromechanical amplifier;

Fig. 3 diagrammatically illustrates a further modification of the invention in which the adjustments of the conductively-coupled amplifier are electronically made;

Figs. 3–A and 3–B are fractional wiring diagrams of different forms of input circuits for the several embodiments of the invention; and Figs. 4–10 diagrammatically illustrate further embodiments of the invention as applied to amplifiers and also with associated amplifiers arranged to adjust the former to suppress noise or to eliminate zero error.

Referring to Fig. 1, the invention in one form has been shown as applied to a wide-band amplifier 10 which may be of any conventional conductively-coupled negative feedback type having input terminals 11 and 12 and output terminals 13 and 14. As already explained, with such a conductively-coupled wide-band amplifier difficulty has heretofore been experienced due to the zero drift; that is, a change in the ratio of the input signal to the output signal due to internal changes within the amplifier as may occur by reason of change in filament temperature or development of thermal electromotive forces occasioned by changes in atmospheric temperature or the like, as well as changes in the voltage of the anode supply. In the system for automatically correcting for zero drift of the amplifier or amplifying channel 10, a voltage divider comprising resistors 15 and 16 is effectively connected across the output terminals 13 and 14 in order to bring the point 17 to the same potential as the input terminal 11. This is accomplished by the selection or adjustment of the resistance values for resistors 15 and 16 so that the potential of the point 17 will be at a predetermined relation to the potential of the point 11. The resistances of the resistors 15 and 16 are selected so that the ratio of their sum with respect to the resistance of resistor 16 is the same as the stabilized net gain of the amplifier 10. Accordingly, for zero input there will be zero output of the amplifier 10 and the point 17 will be at zero potential, in the absence of zero error in amplifier 10.

If there be drift in the zero of the amplifier, it will be understood that there will immediately appear a voltage between the point 17 and the input terminal 11, which voltage is applied by way of resistors 18 and 19 to the input of the non-conductive converter-amplifier 20. The output of the converter-amplifier is connected to a control winding 21 of a motor 22, the power winding 23 of which is connected to an alternating-current source of supply 24. The converter-amplifier 20 and the motor 22 may be of the same type as shown in Williams Patent 2,113,164 where the input voltage is converted to alternating current by means of a polarized vibrator operating at the same frequency as the alternating-current source of supply 24. The motor 22 is arranged to adjust the resistor or slidewire 25, which may be included in the circuit of the amplifier in several ways, to return the operation of the amplifier to its initial condition of operation. In general, the adjustment is continued until the disappearance of the voltage between point 17 and input terminal 11. The initial condition of operation has been assumed as one where the amplifier is operating on a linear characteristic curve which passes through zero. As shown in Fig. 1, the adjustment of the resistor 25 is continuous; that is, there will be adjustment whenever and so long as a voltage appears between point 17 and input terminal 11 due to a variation in the predetermined relationship established between the input and the output circuits 11, 12 and 13, 14.

By employing the wide-band amplifier 10 together with the associated system for correcting the zero drift, signals of widely differing character may be applied to input terminals 11 and 12 with assurance that the output signals at the terminals 13 and 14 will bear a predetermined relationship thereto and will be unaffected by zero drift in the amplifier 10. Such input signals may be unidirectional, of constant amplitude or of pulsating character, or they may be alternating in character from zero frequency upward to very high frequencies depending upon the character of the components within the amplifier.

The term "wide-band amplifier" has been used herein to refer to amplifiers in which the only limitation on the frequency range is that imposed by the circuit components and the characteristics of the tubes, and not upon associated operating devices such as vibrators and converters. For example, an amplifier having circuit components and tubes of more or less conventional type will have a frequency range from zero upwardly to a megacycle or so in contrast with amplifiers having 60-cycle vibrators where the frequency range is limited to that of the vibrator.

With signals of any of the foregoing character, the potential difference across the resistor 16 is at all times compared with the input signal applied between the terminals 11 and 12. Any variation between the predetermined relationship results in the application of a signal to the converter-amplifier 20 which is not subject to zero drift. Thus, by combining the wide-band amplifier, stabilized for gain, with the converter or non-conductive type of amplifier, the wide-band amplifier may be utilized for measurement and for other purposes where it is necessary to maintain a predetermined relationship between the input signal and the output signal and in which the output signal is unaffected by zero drift of the wide-band amplifier.

When proper precautions are taken in the design of the amplifier 10, the tendency of the amplifier to drift from zero may be minimized, and in such cases the drift may occur slowly and over relatively long periods of time as by a slow change in the ambient temperature. In such cases, the continuous operation of Fig. 1 need not be utilized.

As shown in Fig. 2, the invention has been applied to a system in which an electromechanical amplifier MR has been provided which serves periodically to return the operation of the amplifier 26 to its desired characteristic curve in the event there has been deviation therefrom. More particularly, the amplifier 26 has been represented by a single stage comprising an amplifier tube shown as a triode, the input circuit of which includes the input terminals 27 and 28, and the output circuit of which includes the output terminals 29 and 30. Included in the input circuit is a potentiometer 31 including slidewire 32 and a source of supply such as a battery 33. In circuit with the cathode of the triode 26 is a cathode resistor 34. It will be observed that the output terminals 29 and 30 are connected across cathode resistor 34, such an amplifier being known as of the cathode-follower type.

As well understood by those skilled in the art, the anode current from a suitable source of supply, such as the batteries 35, flows through the triode 26 and through the cathode resistor 34. Between conductors 36 and 37 a potential difference will be developed. The magnitude of that potential difference is selected, by the point of connection of the conductor 37 along resistor 34 to establish a potential between conductors 36 and 37 equal to the potential difference applied to the terminals 27 and 28.

As in the system of Fig. 1, the magnitude of that selected potential difference, between conductors 36 and 37, will be determined by the amplification constant of the amplifier and will be such as to equal the corresponding component of voltage or potential difference applied across input terminals 27 and 28. It is to be understood that the amplifier may have as many stages as may be desired for the particular application at hand and that the described adjusting means may be included in any stage thereof.

If there should be a change in the potential difference across input terminals 27 and 28 with respect to that across the conductors 36 and 37, such difference will charge the condenser or capacitor 38 which, it will be observed, is connected by a selector switch 39 by way of its stationary contact 40 and a current-limiting resistor 41 to the conductor 27, the other side of the capacitor 38 being connected through the galvanometer coil C of the electromechanical amplifier MR by conductor 36 to the cathode side of cathode resistor 34. After a predetermined time interval, dependent upon operation of the electromechanical amplifier MR, a cam 42 driven by shaft 43 through gearing 44 from a drive shaft **44*a* is rotated until a cam follower 45 registers with a recess of the cam 42 for movement of the selector switch 39 to transfer the connection of the condenser 38 to the stationary contact 46. There is thereby completed a discharge circuit for the condenser 38. The discharge of the condenser through the discharge circuit including the galvanometer coil C produces deflection thereof which, through the electromechanical amplifier MR adjusts the contact 47 of slidewire 32 by an amount and in such a direction as will ordinarily reduce to zero the difference in potential between the selected portion of cathode resistor 34 and that across the input terminals 27 and 28**.

The value of resistance 41 is preferably so chosen with respect to the value of capacitor 38 that the time constant of their circuit is of the same order as the time cycle of amplifier MR. With such values and an applied potential difference due to zero drift, there will be assured a satisfactorily large charge upon capacitor 38 in the time between successive operations of amplifier MR to assure deflection of galvanometer C.

The electromechanical amplifier MR, which is to be taken as of the non-conductively coupled type in the sense it is not subject to zero error, has been illustrated as of the type shown in Squibb Patent 1,935,732, reference to which may be made for a detailed description of operation and construction. In brief, a motor (not shown) drives through shaft **44*a* and gearing 44, the shaft 43 on which are mounted restoring cams 48 and 49 arranged to engage opposite ends of a clutch member 50 rotatably supported, concentric with, but independent of a shaft 51 having secured thereto a clutch disk 52 and a disk 32*a* supporting a slidewire which has been diagrammatically shown in Fig. 2 as the adjustable slidewire 32. The clutch member 50 is provided with a pin 53 engageable by one or the other of the lower ends of a pair of feelers 54 and 55 pivoted intermediate their ends and biased by a spring 56 toward closed position. When the feeler members 54 and 55 are in the fully closed position, they engage the pointer 57 of the galvanometer C. The feelers 54 and 55 are operable by a cam (not shown) carried by shaft 43 periodically to move them from the closed to the open position. The galvanometer pointer is periodically clamped in a deflected position by means of a clamping member 58 movable upwardly to press the galvanometer pointer 57 against a stationary clamping member 59. As shown, the clamping member 58 is moving downwardly under the control of a cam (not shown) to free the pointer 57. Thereafter, the selector switch 39 is moved to engage its stationary contact 46 for discharge of the condenser 38 through the galvanometer coil C. This produces a deflection of the galvanometer pointer 57 which occurs at a time when the feelers 54 and 55 have been separated their maximum distance. The clamp 58 is then elevated to clamp the pointer 57 in its deflected position, at which time the feelers 54 and 55 are released by their operating cam for movement toward closed position by the spring 56. The upper end of the feeler first engaging the end of the pointer, of course, comes to rest, and the other feeler continues its movement toward closed position, the lower end thereof striking the pin 53 to rotate the clutch member 50 until the upper ends of both feelers engage the end of the pointer. With the clutch member 50 in its deflected position, it is then moved under the control of a cam (not shown) against and into driving engagement with the clutch disk 52, but only after the feelers 54 and 55 have again been separated. Thereafter, the restoring cams 48 and 49 engage the uppermost end of clutch member 50 to move it downwardly to the position shown, thereby rotating the shaft 51 and the slidewire-carrying disk 32*a***.

In the above description of Fig. 2, it was assumed that the derived potential difference from the output circuit; that is, from the cathode resistor 34, was of the correct magnitude to balance the corresponding component of the input signal applied across the terminals 27 and 28. In practice, it will be found convenient to provide an adjustable resistor or slidewire 60 in series with a battery 61 across the cathode resistor 34 for neutralizing the normal cathode current which flows in the absence of an input signal. The slider or movable contact 62 of resistor 60 may be manually adjusted with zero input signal until zero output signal appears across the output terminals 29 and 30. Subsequent variations, due to zero drift in the amplifier, will be taken care of by the relative adjustment between the slidewire 32 and its contact 47 under the control of the electromechanical amplifier MR. It is to be understood that the mechanical relay or amplifier MR may serve relatively to adjust resistor 60 with reference to its contact 62, the result of which will be the compensation for zero drift in the amplifier. Such an arrangement has the further advantage that the electromechanical amplifier MR will relatively adjust resistor 60 with respect to contact 62 to reduce the output signal to zero with zero input signal. In the amplifier 10 of Fig. 1 the resistor 25 may be connected either like the slidewire 32 or like the slidewire 60 of Fig. 2.

For an application of the invention to a system which continuously and automatically adjusts for zero drift, reference may be had to Fig. 3 where the invention has been illustrated as applied to a direct-current or conductively-coupled amplifier having associated therewith an alternating-current or non-conductively coupled amplifier including integrating means for producing a corrective action in accordance with the integration of any zero error of the conductively-coupled amplifier. It is to be understood that as many stages of amplification as desired may be provided in the conductively-coupled amplifier, only two being shown in Fig. 3 for purposes of simplicity, the two including the vacuum tubes 100 and 101. The conductively-coupled amplifier is of the negative feedback type and, besides the conventional source of anode supply shown as a battery 102 and the usual filament supply means (not shown), there is provided the resistor 103 in series with the cathode of tube 101 and a battery 104 having its positive terminal connected to ground.

With zero input signal at the input terminals 105 and 106 of the amplifier, the current flow through the tube 101 is such that it produces across the cathode resistor 103 a potential difference equal and opposite to that developed by the battery 104. Accordingly, it will be seen that the conductor 107 will be at ground potential. This conductor is connected to output terminal 108, the other output terminal 109 being at ground potential. The overall gain of the amplifier will be determined by the ratio of the resistance values of resistors 110 and 111. In general, it will be preferred to have the resistor 110 of greater resistance than that of resistor 111, it being understood that the particular values selected will be in accordance with the needs of particular applications. For the reasons previously set forth in connection with Figs. 1 and 2, it is to be understood the forward gain of the conductively coupled amplifier is to be large. It will be remembered it is to be large so that the grid of tube 100 will be more nearly maintained at ground potential upon change of the signal applied to input terminals 105 and 106. With zero input signal, as already assumed, the grid will be at ground potential, since the conductor 107 was brought to ground potential in manner already described.

In the cathode circuit of the tube 100 is a cathode resistor 112 through which also flows the cathode current from a tube 113, to the grid of which is applied the output from the integrator, generally indicated as that part of the circuit within the broken lines 114. With zero input signal at the terminals 105 and 106, the cathode current through the resistor 112 will be adequate to produce a potential difference thereacross somewhat greater than the voltage of the battery 104. In other words, the cathodes of tubes 100 and 113 will be made somewhat positive with respect to their grids and ground. It may here be observed that if the current through the tube 100 increases, the potential drop across the resistor 112 will be increased. The effect upon the tube 113 is to make its cathode more positive with respect to its grid and, hence, will decrease the current flowing through tube 113. In other words, as the current through tube 100 increases, the effect on the tube 113 is a reduction of its current by a corresponding amount, or approximately so. The converse is also true if it be assumed there is a decrease in the current through the tube 100.

Assuming now there is applied to the input terminals 105 and 106 an input signal of polarity which makes the grid of tube 100 somewhat more positive, it will be seen at once that the current through the tube 100 will increase. Due to the inclusion of a resistor 116 in series with the source of anode supply in the tube 100, the voltage developed at a conductor 115 will decrease or become less positive with respect to ground. This means that the potential applied by way of conductor 115 and resistors 117 and 118 will change in the direction to make the grid of tube 101 less positive or more negative with respect to ground and, thus, will decrease the current flow through the tube 101. With a decrease in the current flow through the tube 101, and through resistor 103, there will appear between the conductor 107 and ground a negative potential difference, which will be in a direction to oppose at the grid of tube 100 the positive signal which was assumed to be applied thereto. Thus, the action is such as to maintain the grid of the tube 100 at approximately ground potential.

The amplified output from the tube 101 may be utilized in manner well understood by those skilled in the art such, for example, to operate an indicating device, or a milliammeter may be connected in series with the cathode resistor 103.

With the above understanding of the operation of the negative feedback amplifier, it is now to be understood that any spurious or extraneous effects within the amplifier will tend to produce a drift in the operation of the amplifier from a selected characteristic curve, one which in the preferred form of the invention passes through zero.

The manner in which the conductively-coupled amplifier is maintained in operation in accordance with a selected characteristic curve will now be described. First, it will be assumed that there is zero signal applied to the input terminals 105 and 106, and because of one of the many factors which effect or produce zero error, there appears in the amplifier a change in the operating characteristic of the same type which would be produced by the appearance at the grid of the tube 100 of a positive potential difference. Accordingly, the grid of the tube 100, which in the absence of the spurious potential difference was at ground potential, will be positive with respect to ground. A vibrator 119 operated by a coil 120 from a suitable source of alternating-current supply 121 serves periodically to connect a coupling capacitor 122 in the grid circuit of amplifier tube 123, first to the grid of tube 100 and then to ground. Accordingly, there is applied to the grid of tube 123 a periodically changing potential or signal which produces in the output of tube 123 an alternating-current output.

The tube 123 is included in the first stage of the non-conductively coupled type of amplifier. The first stage is provided with a conventional anode resistor 124, a grid resistor 125 and a cathode-biasing network 126. Several additional stages of amplification may be provided, though only a second stage has been illustrated including a coupling capacitor 127, a second amplifying tube 128 having a grid resistor 129, and a cathode-biasing network 130. Across the anode resistor 131 of tube 128 is connected the primary winding of an output transformer 132, the center tapped secondary winding of which is connected through resistors 133 and 134 to the stationary contacts of a vibrator 135. The vibrator is operated by coil 136 energized from the same source of supply 121 as the coil 120. The center tap of the secondary winding of transformer 132 is connected to ground. The alternating-current signals produced at the secondary winding of transformer 132 are rectified by the vibrator 135 and integrated by a capacitor 137 connected to the grid of tube 113 and ground.

As shown, the vibrator 135 will be so phased with respect to the vibrator 119, both being of the polarized type, that there will be applied to the grid of tube 113 a negative potential difference due to the assumed positive potential applied to the grid of the tube 100. Accordingly, the current flowing through the tube 113 will decrease, and the potential drop across the cathode resistor 112 will be correspondingly decreased. The reduction in the potential difference (which, it will be remembered, biases the cathode positive with respect to the grid) across cathode resistor 112 results in decreasing the potential difference between the cathode of tube 100 and ground, the effect of which is to increase the current through tube 100. The increased current through tube 100, as has already been described, increases the potential drop across the resistor 116 and thus reduces the potentail difference applied to the grid of the tube 101. Accordingly, less current then flows through the tube 101 and through the cathode resistor 103. The result of that decrease is to restore the conductor 107 to ground potential. Accordingly, there is provided, concurrently with the appearance of the spurious signal, the assumed positive voltage at the grid of the tube 100, a corrective action which returns the conductor 107 and the grid of tube 100 to ground potential.

From the foregoing understanding of Fig. 3, it will be seen that the conductively-coupled amplifier, including the tubes 100 and 101, functions substantially independently of the non-conductively coupled amplifier, including the tubes 123 and 128, which serves constantly to check on the operation of the conductively-coupled amplifier and to modify the operation thereof in such manner as to correct for zero error. While the non-conductively coupled amplifier might function as a proportional control system as by reducing the capacitance of capacitor 137 and shunting it with a resistor, the integrating capacitor 137 used in conjunction with resistors 133 and 134 is preferred for several reasons. If there is an exceedingly slow changing factor which produces zero error, as a departure in the operation of the conductively-coupled amplifier from a selected characteristic curve, that small departure will be continuously integrated and, accordingly, no matter how small the departure may be, there will ultimately be correction for it. For cases where the input signal rapidly changes during a very short interval of time, the non-conductively coupled amplifier, together with its integrating circuit, does not introduce into the conductively-coupled amplifier signals of consequential magnitude, which might be expected with proportional control.

Another advantage of the integrating compensating system is that the non-conductively coupled amplifier need not be designed for a wide frequency band characteristic. Its band width may be relatively narrow, inasmuch as it produces a correction proportional to the time integral of the departure of the grid of tube 100 from ground potential.

The system of Fig. 3 functions to correct for the various disturbanes which may produce zero drift or zero error such as variations in cathode temperature, disturbances of an electrical, magnetic, mechanical or thermal nature, and including changes in voltages of batteries 102 and 104. For example, it will be assumed that the voltage of battery 104 slowly decreases over a period of time. Such a decrease in voltage of battery 104 will result in an increase in the potential on conductor 107 in a positive direction with respect to ground. Such an increase will make the grid of tube 100 positive, and thus the system will function as though the earlier assumed positive potential difference had been applied between the grid and cathode of tube 100.

Assuming a slowly decreasing voltage of the battery 102, there will be a corresponding reduction in the potential difference across cathode resistor 103 because of the reduced current flow. Accordingly, the conductor 107 will be made more negative with respect to ground and the grid of tube 100 will, of course, reflect the same negative potential with respect to its cathode. In this case the rectified output from the non-conductivity coupled amplifier will produce a positive voltage across the integrating capacitor 137 to increase the current flowing through the tube 113 and through the cathode resistor 112. The latter increases the potential difference across resistor 112 and makes the cathode of tube 100 more positive with respect to ground, decreasing the current through tube 100 and increasing the signal or potential difference applied by conductor 115 to the grid of tube 101. Accordingly, the current of tube 101 is increased, the increase being sufficient to return the potential difference across cathode resistor 103 to its original value in compensation for the decrease resulting from the decrease in voltage of battery 102. Again it is emphasized that changes in battery voltages are likely to occur very slowly, but any zero error due to such change will be integrated by the capacitor 137 and corrections made in the conductively-coupled amplifier in compensation therefor.

From the foregoing, it will be seen that changes due to temperature variations in the values of resistors 103 and 112 and other similar changes in circuit components will not be effective to introduce zero error in the operation of the conductively-coupled amplifier, since compensation therefor will be made in manner already described.

Since the system automatically corrects for any variations due to changes in circuit components, characteristics of tubes, and the like, such circuit elements need not be of the precision type. In operation, tubes of the same type may be interchanged, or tubes of the same type replaced without disturbing the operation of the amplifier. If a substituted tube should differ slightly from the tube which it replaces, the system functions immediately to bring the conductively-coupled amplifier back to its predetermined characteristic curve for operation free of zero error. However, it is desirable that the ratio of resistances of resistors 110 and 111 be maintained constant, and they should be selected to achieve that objective.

The negative feedback circuit including conductor 107, the grounded conductor G, resistors 110 and 111, the connection to the grid of tube 100 and the connections to the input terminals 105 and 106 should be free of thermal voltages, such freedom thereof being a matter of selection and design in accordance with well understood practice, such as set forth in a paper entitled "D.C. Amplifier Stabilized for Zero and Gain," appearing in the A.I.E.E. Transactions, vol. 67, pages 47–57.

In the modification of Fig. 3 and in other modifications of the invention, it is to be understood that the input signal applied to the input terminals 105 and 106 may be from a current source instead of primarily a voltage source. Where the input signal is from a current source, either of the modifications of Figs. 3–A and 3–B may be utilized. In both figures only fractional parts of the system of Fig. 3 have been illustrated. In Fig. 3–A the current input signal is applied to the input terminals 105 and 106. A current path is provided between the input terminals by the resistor 111, the resistor 110, preferably having a high resistance value, being connected in series with the conductor 107. Considering only the input signal, there is a current path through the resistor 111. Considering only the current in the feedback circuit, the flow will be in an opposing direction through the resistor 111. The component of current from the negative feedback circuit is always equal and opposite to that of the signal input current. Accordingly, a voltmeter V may be connected across conductor 107 and the ground conductor G, the reading of which after division by the resistance of resistor 110, will be a measure of the input current flowing between input terminals 105 and 106.

In Fig. 3–B an ammeter A is included in the circuit of conductor 107. The feedback current flows only through the resistor 110, which is in series with the resistor 111 as viewed from the input terminals 105 and 106. With resistor 110 of low value relative to that of resistor 111, adequate feedback current may flow to operate the ammeter A as a measure of the current signal applied to input terminals 105 and 106.

In the system of Fig. 3 the input circuit is of the low impedance type, preferred for low impedance signal sources producing flow of current through the resistors 110 and 111.

Figure 4:
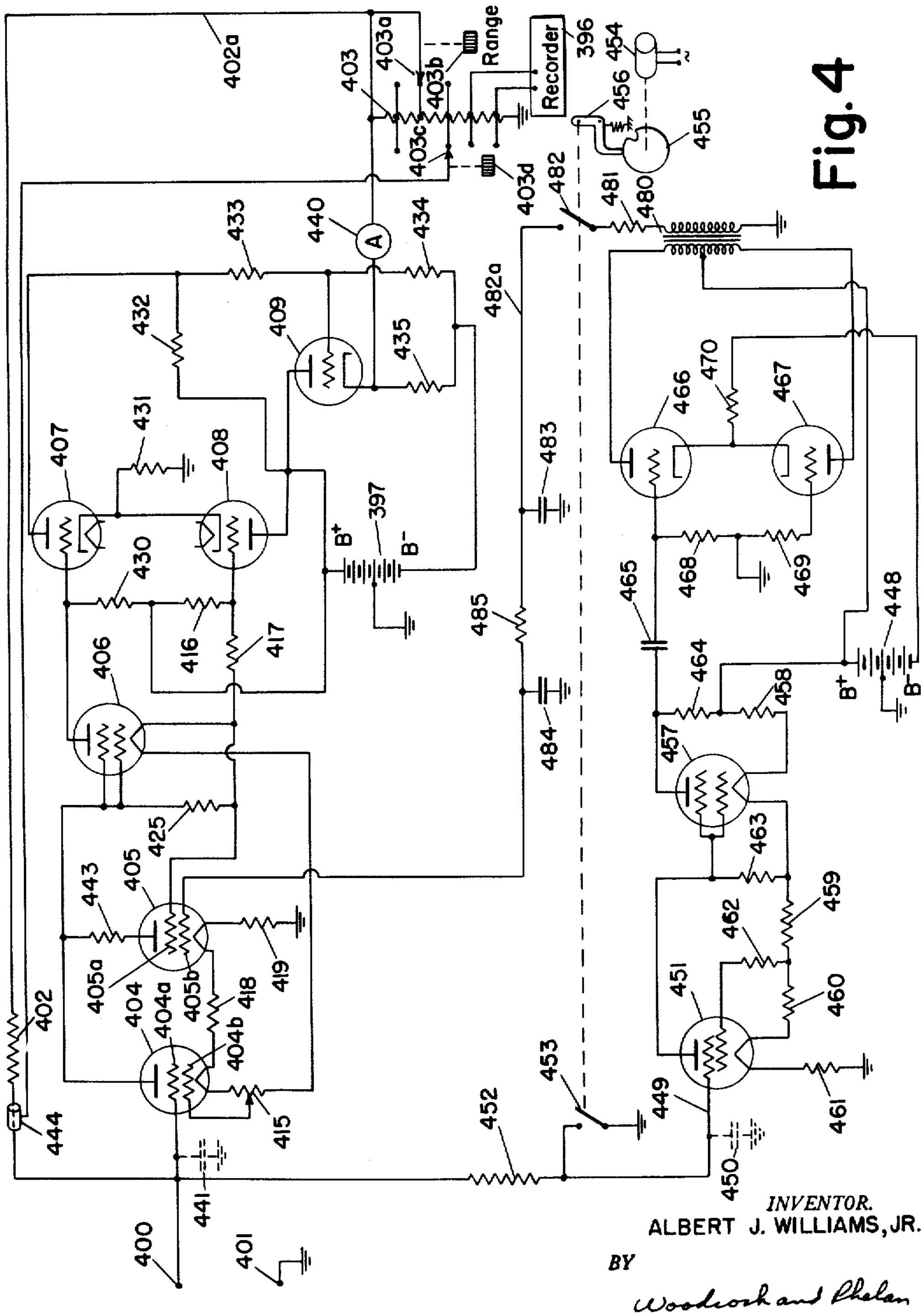
Figure 4A:
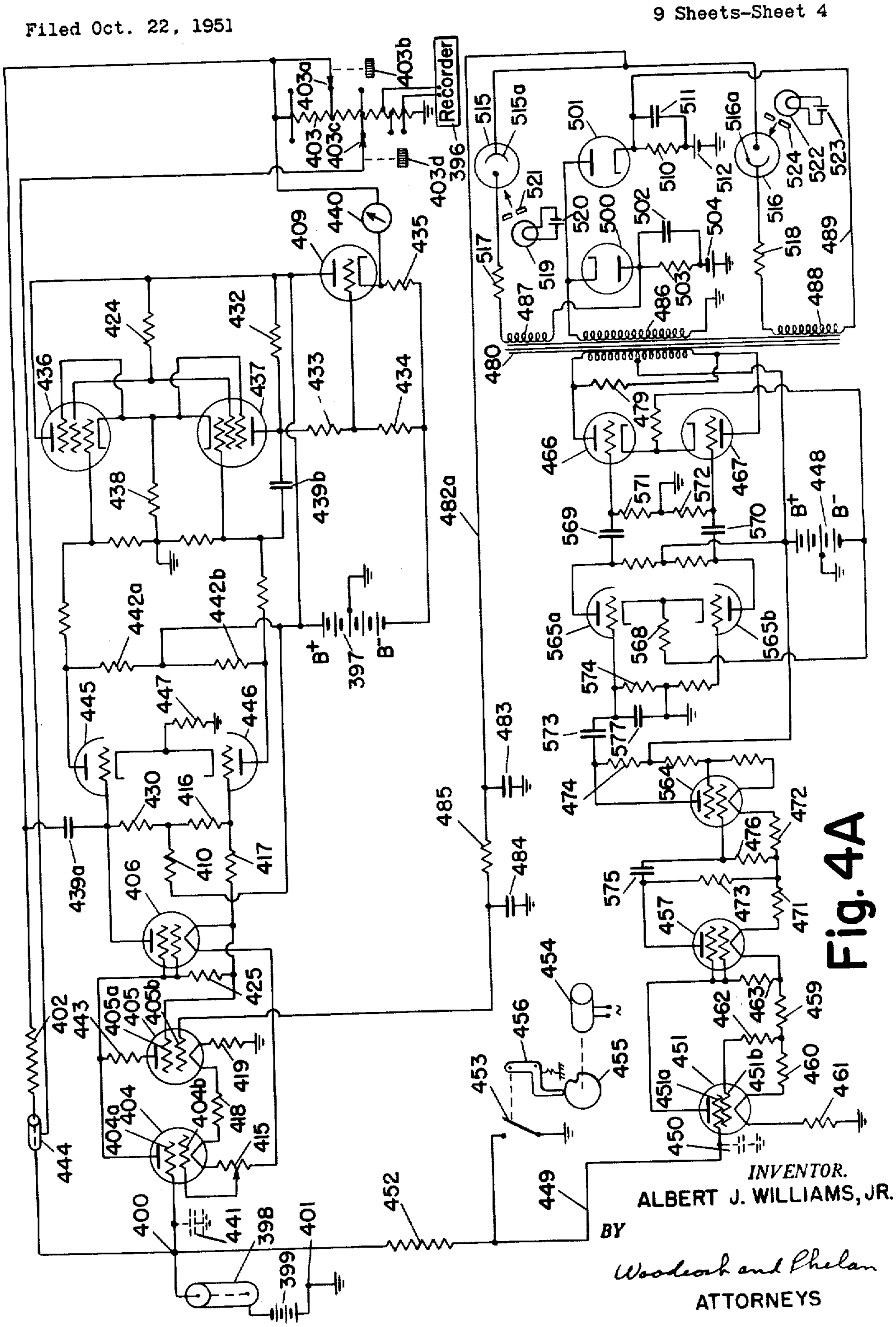

While the system of Fig. 3 has been found to be satisfactory for many applications, it is not as well adapted to the measurement or detection of minute currents as the system of Fig. 4. For example, because the flow of current from an ion chamber is of an exceedingly low order, the measuring system requires a sensitivity capable of detection of currents of the order of $10^{-15}$ amperes. The problem is the same as detecting a current of the order of $10^{-15}$ amperes flowing through a resistor of the order of 1,000,000 megohms.

With current magnitudes of the order indicated above it has been found that upon movement of switch contacts such as those associated with vibrator 119 of Fig. 3, a charge is carried to and from the stationary contact by the movable contact. This transfer-charge effect is believed to be due to slight dissimilarity in the composition of the surfaces of the movable and stationary contacts. Though both may be made of the same material, for example gold, nevertheless, in operation one of the contact surfaces will differ from the other sufficiently to exhibit the transfer-charge effect. Whether the transfer-charge effect be due to the chemical or metallurgical differences in the surfaces thereof, all transfer-charge effects are wholly eliminated or reduced to an entirely negligible effect in manner to be explained in connection with Fig. 4. One requirement is that instead of a vibrator operating at a frequency of, say, 60 cycles per second, there be provided a switch operated only after a relatively long interval of time, a time interval sufficiently long that any current produced by a transfer charge will be small as compared with the magnitude ($10^{-15}$ amperes) of the current being measured. By reason of these requirements, the amplifier as a whole of Fig. 4 substantially differs from that of Fig. 3, and the manner in which the corrective signal is applied to the amplifier to overcome zero drift is substantially different.

For ease in understanding the system of Fig. 4, there will first be briefly described the operation of the amplifier itself followed by the manner in which correction is made for zero drift. It is to be understood that where the word "amplifier" has been used, it is not required that there be high forward gain unless that requirement be explicitly stated. The reason for this statement will appear in the further description of Fig. 4.

The amplifier proper, illustrated diagrammatically in simplified form, comprises input terminals 400 and 401, vacuum tubes 404 and 406 preferably of the electrometer type, conventional vacuum tubes 407 and 408, and a cathode-follower output stage including tube 409. A third electrometer tube 405 is included in the amplifier, and the manner in which it applies to the amplifier the corrective signal discussed above will be later described.

Though the input circuit from terminals 400 and 401 may be modified for the application thereto of a voltage, it has been illustrated for application thereto of a current, the magnitude of which is to be measured. With a current source such as an ionization chamber (illustrated in Fig. 4–A) whose current is in general quite low, current from the source will flow through a resistor 402 and a resistor 403 to ground, the direction of flow, of course, depending upon the polarity. The resistor 402 has a high resistance value as compared with resistor 403. Current from input terminals 400 and 401 flowing through resistor 402 raises the potential of a control grid 404*a* of the electrometer tube 404 with respect to ground and cathode. Current flow in the reverse direction toward input terminal 401, of course, would lower the potential of the control grid with respect to ground and cathode. With an elevated potential on the grid 404*a* of tube 404 its conductivity is increased. The resulting increased flow of current through tube 404 from B+ of a suitable source of anode supply such as battery 397 by way of resistors 416, 417 and 425 makes the control grids of electrometer tube 406, connected as a high mu-triode, more negative with respect to their cathode and decreases the conductivity of tube 406. Accordingly, the potential applied to the grid of tube 407 is correspondingly increased by reason of the decreased IR drop across resistor 430. The tube 408 minimizes changes in the cathode potential of tube 407 relative to ground over a wide range of change in conductivity of tube 407. That result is accomplished in manner somewhat similar to circuit arrangements later described. In brief, the potential between the cathode of tube 407 and ground depends upon the potential drop across resistor 431. The current flowing through that resistor is the sum of the currents flowing through tubes 407 and 408. When the current flow through tube 407 increases, the potential of the cathodes will rise due to the increased current flow through resistor 431. However, the rise in the potential of the cathode of tube 408 increases the potential difference between it and its control grid, the effect on conductivity being to decrease the current flowing through tube 408. This decrease desirably compensates for the rise which otherwise would take place on the cathode of tube 407 were it not for the compensating function of the tube 408.

The increased current flow through tube 407 by way of resistor 432 decreases (makes more negative) the potential of the grid of tube 409 relative to its cathode, the application of the signal being by way of coupling resistors 433 and 434 and by way of cathode-follower resistor 435.

The manner in which the detection of the current flowing between input terminals 400 and 401 is made by the cathode-follower stage, including tube 409, will be more readily understood by first considering assumed conditions in the cathode-follower stage, with zero input current to terminals 400 and 401. With zero current input between terminals 400 and 401, there will be current flowing through the tube 409 and cathode-follower resistor 435, the magnitude of the current being such that the potential drop across cathode-follower resistor 435 is equal and opposite to the potential of the battery between B− and the ground connection.

When there is a current input between terminals 400 and 401 (corresponding with the grid 404*a* of tube 404 being made more positive) with resultant decrease in potential of the grid of tube 409, the lowered flow of current through cathode-follower resistor 435 reduces the potential difference across resistor 435, and current then flows from the battery 397 by way of the ground connection, resistor 403, ammeter 440, cathode-follower resistor 435, and to B−. The magnitude of the current flowing through the ammeter 440 will be directly proportional to the current flowing between terminals 400 and 401. The effect of current flow through resistor 403 is to increase the negative feedback by way of conductor 402*a* and resistor 402.

With a change of current flow through cathode-follower resistor 435, there will be a change in current through the ammeter 440. The proportionality of the change is determined by the resistance of range resistor 403. As illustrated, the part of resistor 403 effectively in circuit with the ammeter 440 extends from the ground connection to the movable contact 403*a*, adjustable relative to the range resistor by the knob 403*b*. Adjustment may be either continuous or in steps for changing the range of the resistor 403 by an amount corresponding with the graduations on the scale of the meter 440, or by multiples of 10 as may be desired. Assume that the contact 403*a* be connected to a connection nearer ground to decrease the resistance of range resistor 403. Then for the same change in current through cathode resistor 435 as before, there will be required a larger current flow through range resistor 403 to develop the required potential difference. The effect is to increase the sensitivity of the measuring system as a whole by producing greater deflection of ammeter 440 with a given current flow between input terminals 400 and 401.

It will be remembered that the resistor 402 is of high resistance. For measurement of currents of the order which are obtained from an ionization chamber, resistor 402 may have a value of the order of $10^{12}$ ohms. Such a high resistance will attenuate as between the output of the amplifier and the input of the amplifier any high-frequency signals which may appear in the output circuit including range resistor 403. With such a high resistance the time constant of the feedback circuit is quite high for voltage feedback from range resistor 403 to the input grid 404*a* of tube 404, though the only capacitance in the circuit may be the stray capacitance indicated as "lumped" by the broken line illustration of capacitor 441. It may here be noted that the time constant of the amplifier with respect to current supplied to the input terminals 400 and 401 is not long but quite short. Instead of being determined by the product of the resistance of 402 and the capacitor 441, it is determined by that product divided by the forward gain of the amplifier. The forward gain is preferably quite high. In the modification of Fig. 4–A it is of the order of 1,000.

To overcome the effects of high-frequency disturbances including voltage-noise appearing at the input circuit or at any of the intermediate stages of the amplifier, there is provided a separate feedback circuit extending from movable contact 403*c* of range resistor 403 to air capacitor 444 which as illustrated may conveniently take the form of a small brass cylinder or ring encircling the lead to the input grid. Its capacitance is of a low order but adequate to provide negative feedback to the grid 404*a* of tube 404 to eliminate or greatly to decrease any high-frequency signals, whatever may be the cause, which may appear in the output circuit of the amplifier.

The stray capacitance as represented by capacitor 441 will for different applications of the measuring system vary in amount. For example, the stray capacitance may be greater with a long cable extending to the ionization chamber than for a short cable. As the capacitance of 441 increases, the time constant of the circuit including resistor 402 with respect to feedback of high-frequency signals from the range resistor 403 will increase with even greater attenuation of such signals. Accordingly, it will then be desirable to increase the magnitude of the negative feedback by way of capacitor 444, and this may be conveniently done by varying the position of contact 403*c* along range resistor 403 by means of knob 403*d*. As it approaches nearer the position of contact 403*a*, the magnitude of the signal fed back by way of capacitor 444 increases. It is an advantage to use range resistor 403 both for changing the measuring range of the system and also for adjusting, as desired, the amplitude of the negative feedback signal introduced by way of capacitor 444.

Returning now to the description of Fig. 4 with particular emphasis upon the manner in which variations between the input signal and the output signal of the character due to zero drift are compensated for, it will be remembered that in the earlier modifications of the invention there was derived from the amplifier a control signal of reversible polarity dependent upon the direction of the difference between a fraction of the output signal and the input signal, the magnitude of the control signal depending upon the size of that difference. In Fig. 4 the potential between the grid and cathode of tube 404 is determined by the potential drop across resistor 402. However, the action of the amplifier itself is to produce a current flow through the range resistor 403 which, in manner already described, produces an indication on the ammeter 440 of the magnitude of the current flowing between terminals 400 and 401. The direction of flow of current through the range resistor 403 produces a potential drop across it in a direction equal and opposite to the potential drop across the resistor 402 except for the error voltage, which is that small fraction of the input signal needed to produce an output of the amplifier required for the detection or measurement of the input signal. Accordingly, with a high forward gain, it will be seen that the control grid of tube 404 is maintained quite close to ground potential. Any deviation of the input grid from ground potential will be due to zero drift of the amplifier, or causes giving rise to an effect similar to that which would be produced by zero drift.

With the input grid of tube 404 at other than ground potential there will flow through resistor 452, preferably having the same resistance value as resistor 402, a charging current for a capacitor 450, which as illustrated may merely be the stray capacitance associated with lead 449 to the control grid of tube 451. Thus, the capacitor 450 will accumulate a charge.

If switch 453 now be closed, the capacitor 450 will be discharged with resultant application to the tube 451 of a signal impulse. Tube 451 is preferably of the electrometer type and so is tube 457, the latter tube connected as a high mu-triode. These tubes, with other stages, not illustrated, provide high forward gain in an amplifier for the pulses applied to tube 451, that pulse being applied to the primary winding of a transformer 480 by way of the output tubes 466 and 467 connected in push-pull relationshihp. By means of a switch 482 operated synchronously with the switch 453 by means of synchronous motor 454, cam 455 and cam follower 456, there is provided half-wave rectification. There are eliminated from the circuit including conductor 482*a* half-cycles of polarity opposite to the half-cycles resulting from the discharge of the capacitor 450 by way of switch 453. Thus, the amplified pulses resulting from each discharge of capacitor 450 are applied by way of the secondary winding of transformer 480 to integrating capacitor 483 through resistor 481, switch 482 in closed position, and lead 482*a*. The charge on capacitor 483 will be the result of integration of the pulses transmitted by way of switch 482. The charge or potential difference across capacitor 483 is applied to a control grid of the electrometer tube 405 by way of resistor 485. A capacitor 484 is connected between ground and the lead interconnecting resistor 485 and the control grid of electrometer tube 405. The RC constant of resistor 485 and capacitor 484, by suitable selection of values thereof, is made equal, or approximately so, to the RC time constant of resistor 402 and capacitor 441. By so doing, there is a shaping of the pulse fed to tube 405 to return the control grid of tube 404 to approximately ground potential with minimum disturbance of normal operation of the amplifier. If a sharp pulse were applied to capacitor 483 and directly to tube 405, there would be wide swings in the output potential beyond that needed to return the grid of tube 404 to ground potential. By making the time constant of 484—485 approximately equal to the time constant of resistor 402 and capacitor 441, there is in effect attained without "overshoot" or "undershoot" return of the grid to ground potential.

Referring now with greater particularity to the action of the electrometer tube 405, when the voltage of capacitor 483 changes in a direction to increase or to make the control grid 405*b* of tube 405 more positive with respect to its cathode, the conductivity of the tube will, of course, be increased. Accordingly, there will be a greater flow of current through the resistor 443 in series with the anode of tube 405. The increased potential drop across resistor 443 because of the corresponding increase in current flowing through resistor 425 (effectively in series with anode resistor 443) makes the control grids of tube 406 more negative with respect to cathode and thus decreases the conductivity of tube 406. The operation of the circuit with decreased conductivity of tube 406 has already been described, and it will be recalled that the end result is that the conductivity of tube 409 is decreased with a resultant greater current flow through range resistor 403. Accordingly, there will be fed back by way of contact 403*a* and resistor 402 an increased negative voltage which will be of magnitude to return the control grid of the tube 404 to ground potential in correction for the departure therefrom due to "zero drift," or equivalent cause. The action of tube 405 in thus modifying the output of the amplifier as a whole returns the operation thereof to one in which there is elimination to a negligible degree of the effect of zero drift and reduces zero drift to an amount of the order of the reciprocal of the forward gain of the amplifier channel including tubes 451 and 547. ( The resistor 443 is included in circuit with the tube 405 to increase the linearity of the operation thereof. It is not essential and in some cases may be omitted.)

Emphasis is again made of the fact that any current flowing through the resistor 452 by reason of departure of the grid potential of tube 404 from ground is of a very low order and comparable to the low order of current which the system is designed to detect or measure. For example, the current flowing to the capacitor 450 may be as low as $10^{-15}$ amperes. With a sensitivity of the order indicated, the switch 453, if it were effective to transfer electrons from the circuit including the grid of tube 451, the charge on capacitor 450 would be greatly affected and that charge would no longer be representative of the departure of the potential of the control grid in tube 404 from ground. If the zero drift were small, the action of switch 453 in transferring charges might be sufficient to prevent the production of a pulse and prevent the correction of zero drift of such low order. Conversely, if the charges were transferred in the reverse direction, there would be a spurious correction wholly undesired. However, it has been found that with a circuit having the time constant of the order of resistor 452 and capacitor 450, the effect of periodic operation of switch 453 is reduced to a wholly negligible value by operating it at a frequency not greatly in excess of about one operation every 15 seconds, the selected frequency of operation thereof in several satisfactory embodiments of the invention being of about that order. For many applications the switch 453 may be operated less frequently, and for some applications it may be operated somewhat more frequently, but preferably, for current sensitivities of the order indicated, not in excess of once in about every 15 seconds. Where the desired current sensitivity is less, for example of the order of 1.5 times $10^{-14}$ amperes, the frequency of operation of the switch 453 may be of the order of about once every second, and for a sensitivity of 4.5 times $10^{-13}$ amperes the frequency of operation of switch 453 may be of the order of about 30 cycles per second.

It will be recalled that the control signal is applied to electrometer tube 451 in the form of impulses obtained as a result of the discharge of capacitor 450 resulting from the periodic closure of switch 453. The amplified impulse in the form of a half-wave is applied from the secondary of transformer 480 to the integrating capacitor 483 by way of the switch 482 which is closed during the time interval of production of the impulse. The other half-wave appearing at the transformer and resulting from the application of the pulse to the electrometer tube 451 is not applied to the integrating capacitor 483 for the reason that the switch 482 is in its open position during the appearance of the other half-wave at the secondary of transformer 480.

The foregoing is accomplished by mechanically interconnecting switches 453 and 482 or by producing synchronous operation by equivalent means. In some applications it was found desirable to sectionalize certain parts of the system, that is to say, to locate the input stages of both amplifying channels at one physical location and the remaining stages at a different location. Physical separation of that kind made quite difficult the problem of synchronous operation of switches 453 and 482. In accordance with the invention, as illustrated in Fig. 4–A, the functions of switch 482 have been retained, but those functions are performed in an entirely different manner. In Fig. 4–A the amplifier channels have been shown with more tubes and closely correspond with an embodiment of the invention which has been found to operate quite satisfactorily.

Since the operation as a whole is the same as in the system of Fig. 4, it will only be briefly described in connection with the application to control grid 404*a* of electrometer tube 404 of an input signal of polarity which tends to make the control grid more negative with respect to its cathode, the reverse of the operation described for Fig. 4. Accordingly, it will be assumed that from an ionization chamber 398 including a bias battery 399 there is applied to the control grid 404*a* a signal which makes that grid more negative with respect to its cathode. It may here be observed that grid 404*b* of tube 404 is connected to a resistor 415 which applies a potential to that grid maintaining low the transconductance of the tube, a connection conventional for the operation of electrometer tubes. Though shown as adjustable, the connection to the cathode resistor 415 may be fixed as in the case of the electrometer tube 451, the first grid 451*b* of that tube being connected in manner similar to that of grid 404*b* of tube 404 and for the same purposes.

When the grid 404*a* is made more negative, the current flow through tube 404 is decreased. Accordingly, the signal developed on the control grids of tube 406 is increased or made more positive (there is less IR drop through resistor 425). With the resultant increased current flow through tube 406, the signal on the control grid of tube 445 is decreased, and the potential drop across cathode resistor 447 decreases. The cathode of tube 446 is thereby made less positive and hence the current flow through tube 446 increases, thus tending to maintain the cathode bias of tubes 445 and 446 more nearly at the same potential with changing conductivity of tube 445. Stated differently, the action of tube 446 tends to maintain the current through cathode resistor 447 at more nearly a constant value than if tube 446 were not included in the circuit.

With decreased conductivity of tube 445, the control grid of tube 436 is made more positive with respect to cathode, while the control grid of tube 437 is made more negative with respect to cathode. The decreased current flow through tube 437 reduces the potential drop across resistor 432 and, hence, makes the grid of tube 409 more positive with respect to its cathode and increases the conductivity of tube 409. It will be recalled that the potential developed across cathode resistor 435 is equal and opposite to the potential between B— and ground of battery 397, with zero input to terminals 400 and 401. With increased current flow through tube 409 and cathode resistor 435, the current needed to develop an equal and opposing potential difference across resistor 403 is decreased and, hence, deflection of the ammeter 440 indicates the reduction in the signal applied to the electrometer tube 404, either as an indication of the change in signal or as a measurement of the magnitude thereof. As shown, a recorder 396 is connected across two points on range resistor 403. Since the potential drop across that portion of the resistor is proportional to the value detected or measured by meter 440, it is suitable for application to the recorder 396. Where recorder 396 is employed the meter 440 will not be used or included in the series-circuit where it is now illustrated, and vice versa.

The function of tube 436 and the cathode resistor 438 is similar to that of cathode resistor 447, i.e., to maintain the potentials of the cathodes more nearly constant than would be the case without the inclusion of tube 436.

The several resistors illustrated, such as resistors 410, 442*a*, 442*b* and 424 are conventional. Typical tube types and values of circuit components not mentioned above are set forth in the following tables:

*Resistors*

| Resistors No.: | Ohms |
|---|---|
| 402, 452 | $10^{12}$ |
| 403 | 100,000 |
| 415, 461 | 290 |
| 416, 459 | 100 |
| 417 | 2870 |
| 418, 419 | 60 |
| 433 | 10,000 |
| 434 | 6,100 |
| 435 | 22,000 |
| 443 ——meg. | 2 |
| 460 | 190 |
| 462 | 9200 |
| 425, 463, 473 ——meg. | 1 |
| 471 | 2870 |
| 472 | 150 |
| 474 ——meg. | 2 |
| 476 ——meg. | 500 |
| 479 | 150,000 |
| 485 | 1000 |
| 503, 510, 517, 518 ——meg. | 18 |
| 571, 572 ——meg. | 4.7 |
| 574 ——meg. | 5 |

*Capacitors*

| Capacitor No.: | |
|---|---|
| 439a ——mfd. | .001 |
| 439b ——mmfd. | 30 |
| 441 ——mmfd. | 10–10,000 |
| 444 ——mmfd. | 1–10 |
| 450 ——mmfd. | 10 |
| 483 ——mfd. | 10 |
| 484, 557 ——mfd. | 0.1 |
| 502, 511 ——mfd. | 2 |
| 569, 570 ——mfd. | 1 |
| 573 ——mfd. | 5 |
| 575 ——mfd. | 0.05 |

*Tube types*

| Tubes No.: | Type |
|---|---|
| 404, 405, 406, 451, 457, 564 | VX41A (electrometer) |
| 445, 446 | 12AX7 |
| 436, 437 | 12AU6 |
| 409 | 26C6 |
| 466, 467 | 26A6 (suppressor and screen grids connected to plates for triode operation) |
| 500, 501 | 12AL5 |

The capacitors 439*a* and 439*b* are included to stabilize the operation of the amplifier and to prevent the appearance of oscillations therein. They are respectively .001 mfd. and 30 mfd.

As in the system of Fig. 4, the control grid 404*a* of electrometer tube 404 is maintained closely at ground potential. The departure of that control grid from ground potential will be due either to zero drift in the amplifier or due to a part of the input signal applied to the control grid which does not appear in the output signal developed in the cathode-coupled output stage. Any departure of grid 404*a* from ground potential results in a control signal applied by way of high-resistance resistor 452 to the capacitor 450 which accumulates a charge. Periodically and at the low rate previously described, the switch 453 closes. Upon each closure the capacitor 450 is discharged to produce a pulse applied to tube 451. If it be assumed to be of a polarity which makes the control grid 451*a* of tube 451 more negative with respect to cathode, then tube 457 will be made more conductive, while tube 564 will be made less conductive, the tube 565*a* more conductive, tube 565*b* less conductive by action of cathode resistor 568, while tube 466 will be made less conductive, and tube 467 more conductive. It will be observed tubes 466 and 467 have their anodes connected in push-pull relationship to the primary winding of transformer 480.

With the initial assumption of a control signal of polarity which makes the grid of tube 451 more negative with respect to cathode, there will be produced in secondary windings 487 and 488 pulses tending to flow through such windings from bottom to top. Thus, from the top winding 487 there will flow a pulse of current by way of resistor 517, photocell 515, conductor 482*a*, integrating capacitor 483, by way of ground connection, bias battery 504, anode resistor 503 and thence to the bottom of secondary winding 487. The pulse of current flowing into integrating capacitor 483 tends to raise in a positive direction the potential of conductor 482*a*. The increased potential is applied by way of resistor 485 to capacitor 484, the resistor and the capacitor shaping the pulse for application to the control grid of the electrometer tube 405. The capacitor 484 and the resistor 485 shape the pulses as applied to the amplifier to minimize, if not entirely to overcome, any overshoot in the correcting action of the main amplifying stage. The rise in potential of that control grid increases the conductivity and decreases the potential applied to the control grid of tube 406. The decreased potential on tube 406, it will be recalled, was also achieved when the grid of electrometer tube 404 was made more positive with respect to cathode. Hence, the tube 406 and the amplifying channel as a whole has its operation modified in a direction to correct for the deviation of the input signal to the control grid of 404 in the direction which made it more negative with respect to cathode than it should have been. The corrective action is completed by way of the remainder of the amplifier and results in a change in the negative feedback voltage fed to the point 400 and to the control grid of tube 404. The end result is that the grid of tube 404 is maintained closely at ground potential, where it should be.

The photocell 515 may be of Cetron type CE25–C, though other types of photocells or other unidirectional conductive devices may be utilized. Advantage is taken of the fact that if the cathode 515*a* is illuminated by a small source of light, such as a flashlight bulb 519 suitably energized by battery 520, the forward resistance of the photocell is maintained at a satisfactory low value, while the resistance for reverse flow is maintained at an exceedingly high value, of the order of $10^{10}$ ohms. When the control signal applied to input tube 451 is of reverse polarity, the photocell 516 and its associated circuit functions in the same manner as has been described for tube 515 except, of course, that the polarity of the voltage pulse applied to integrating capacitor 483 is reversed.

One of the features of the rectifying circuit arrangement of Fig. 4–A is that only half-waves are transmitted to capacitor 483, the half-waves corresponding with the pulses produced upon closure of switch 453. After the production of each pulse, there is a half-wave of opposite polarity produced at each of the transformer windings 486, 487 and 488. In order that the transmission system will not respond to what may be called the "trailing" half-wave, the following circuit provisions are made. Since the desired polarity of the pulse which has been described was in a direction which made the upper part of transformer secondary winding 487 positive, the trailing half-wave will be of reverse polarity. As far as the current flow path including tube 515 is concerned, the trailing half-wave is of no importance since the resistance to flow of current from cathode to anode is adequately high. However, with the trailing half-wave the polarity thereof as developed on secondary winding 488 will be in a direction for flow of a pulse in a path from anode to cathode 516*a* of photocell 516.

To prevent such current flow through photocell 516, two provisions are made. First, for the trailing half-wave the upper end of secondary winding 486 is made positive for flow of a pulse through diode rectifier tube 501 and cathode resistor 510 which is in series with the circuit including photocell 516 and transformer secondary winding 488. Cathode resistor 510 has connected in shunt therewith capacitor 511. A pulse of current through cathode resistor 510 develops a potential in the same direction as bias cell or battery 512, and thus increases the potential applied to photocell 516 in a direction to keep it from conducting current. Thus, every trailing half-wave following the production of a desirable pulse through photocell 515 produces through rectifier 501 a pulse through cathode resistor 510 which prevents that half-wave from producing a signal or pulse by way of photocell 516.

In the same manner, when the initial control signal appears at secondary winding 488 of polarity needed to make conductor 482*a* more negative than before, the trailing pulse results in a flow of current through diode rectifier tube 500 and anode resistor 503 to increase the potential drop thereof in the same direction as bias cell or battery 504, and thus prevents flow of the trailing half-wave through photocell 515. Anode resistor 503 has connected in shunt therewith capacitor 502.

The second provision for producing the described selective operation of photocells 515 and 516 as highly efficient rectifiers in the system will now be described. The trailing half-wave, sometimes called the "backwash," is reduced in amplitude by providing a relatively long time constant in the RC coupling provided for tube 565*a* and for tubes 466 and 467. It has been found that a time constant of about fifty times that of the transformer type of output coupling will be quite satisfactory, this corresponding in one modification of the invention with a time constant of about five seconds. Thus, the trailing half-wave (backwash) or that portion of the output signal which follows its first return to and through zero is reduced in amplitude by an amount such that the charge on the integrating capacitor 483 is unaffected thereby.

More specifically, the relatively large time constant referred to is provided by capacitors 569 and 570 and resistors 571 and 572. They provide a time constant of about five seconds with values of the order of magnitudes given in the foregoing tables. The time constant of the transformer-coupled output stage may be of the order of about one-tenth of a second, primarily determined by the resistor 479 connected in shunt with the primary winding of transformer 480. With the two stages having differing time constants, and the more remote stage from the unidirectional conductive means having a materially greater time constant, the pulse produced upon closure of switch 453 is applied to photocell 515 or photocell 516 depending upon the polarity of the pulse, while the trailing half-wave has an amplitude of much lower order and one below that which would produce unwanted flow of current through a photocell.

The trailing half-wave when applied to the unidirectional conductive devices or photocells 515 and 516 has an amplitude of a much lower order than the pulse appearing at the output stage resulting from the discharge of capacitor 450, by reason of the fact that the time constants of successive stages in the amplifying channel are progressively smaller, the range, as already explained, varying from a time constant of about five seconds for one amplifying stage to about one-tenth of a second for the final output stage.

By the foregoing provisions, for impulses of small and medium amplitude produced by operation of switch 453, the trailing half-waves are below an amplitude corresponding with the voltages of bias cells 504 and 512, and the trailing half-waves will be eliminated thereby, while the corrective impulses, not attenuated with the same degree as the trailing half-waves, will be transmitted by one or the other of photocells 515 and 516 to vary the charge on capacitor 483. The bias batteries 504 and 512 provide a bias of the order of one volt, a voltage sufficiently low to insure that pulses of relatively low amplitude as developed at the input of the correcting amplifying channel will be amplified sufficiently effectively to change the charge on condenser 483. Where the corrective pulses, as they appear at the output stage, have a maximum amplitude less than the voltage of bias cells 504 and 512, the drift of the control grid of tube 404 from ground potential will be of a negligible order.

For high amplitude signals there is added to the foregoing effect the production of the opposing potential difference achieved by the provision of the diodes 500 and 501 connected back-to-back and their associated resistors 503 and 510 respectively shunted by capacitors 502 and 511. The bias batteries 504 and 512 have voltages as may be desired and which, as already explained, provide the respective biases for photocells 515 and 516 for transmission thereby of all voltage impulses above a predetermined amplitude.

During periods of operation in which the potential of the control grid of tube 404 remains at ground potential, the voltage on capacitor 483 does not decrease by reason of the fact that bias cells 504 and 512 are included in circuit with each of photocells 515 and 516 with their respective polarities such as to oppose any current flow from capacitor 483 through either of them. Accordingly, the effective resistance of the circuit including capacitor 483 is adequately high to prevent discharge of the acquired charge of capacitor 483 resulting from pulses transmitted through one or the other of photocells 515 and 516.

Where batteries have been illustrated as sources of power supply or for bias potentials such as the biasing means provided by cells 504 and 512, it is to be understood, of course, that "B" supplies, preferably of a closely regulated type, may be utilized or potentials derived from suitable voltage dividing networks across the "B" supply. Preferably, the time constant of the output circuit of the amplifying stage including tube 564 is made greater than the time constant of the output circuit of tubes 565*a* and 565*b*, the greater time constant, of course, being provided by capacitor 573 and resistor 574. While the output stage of tube 457, including capacitor 575, might have a still greater time constant, it has been found satisfactory to provide one of about the same order as for the output circuit of tube 564. The capacitor 577 shunting the grid resistor 574 attenuates high-frequency noise and decreases the rate of rise of an impulse applied to the grid of tube 565*a*.

It is to be noted that while the illumination of the photocells 515 and 516 has been described as relatively uniform, it is not essential that the illumination be constant to within narrow limits. A fairly wide change in illumination which may arise because of decay in the voltage of the respective batteries 520 and 523 will not greatly affect the operation. Where a power transformer is utilized for the power supply for the amplifier, as generally would be the case, it will be convenient to energize the lamps 519 and 522 from a secondary winding which may be readily included in the power transformer.

It is again emphasized that the amplying channels including the electrometer tubes 451 of Figs. 4 and 4–A are useful not only with wide-band direct-current amplifiers which have been referred to as amplifiers of the conductively-coupled type, but such separate amplifying channels are also useful in connection with amplifiers of the alternating-current type, which have been referred to as non-conductively coupled amplifiers. More particularly, if instead of a contact type modulator (such as the vibrator 119 of Fig. 3), there be included in the systems of Fig. 4 or Fig. 4–A a capacitor type of modulator which would be inserted in series in the grid circuit of the control grid of the tube 404, such an amplifier, even though having applied thereto an input signal essentially alternating in character, would be subject to drift. Such drift may be encountered due to the fact that with change in the surface character of the plates forming the capacitor type of modulator there would be a drift or change in the applied signal due solely to the changing character of the surface of the capacitor plates and not due to the applied input signal. Any changes of this character, however, would give rise to a potential differing from ground. Such potential would be applied to the electrometer tube 451 and its associated amplifying channel to modify the operation of the amplifier channel to which the signal to be detected or measured is applied to overcome the effects giving rise to the drift.

Figure 5:
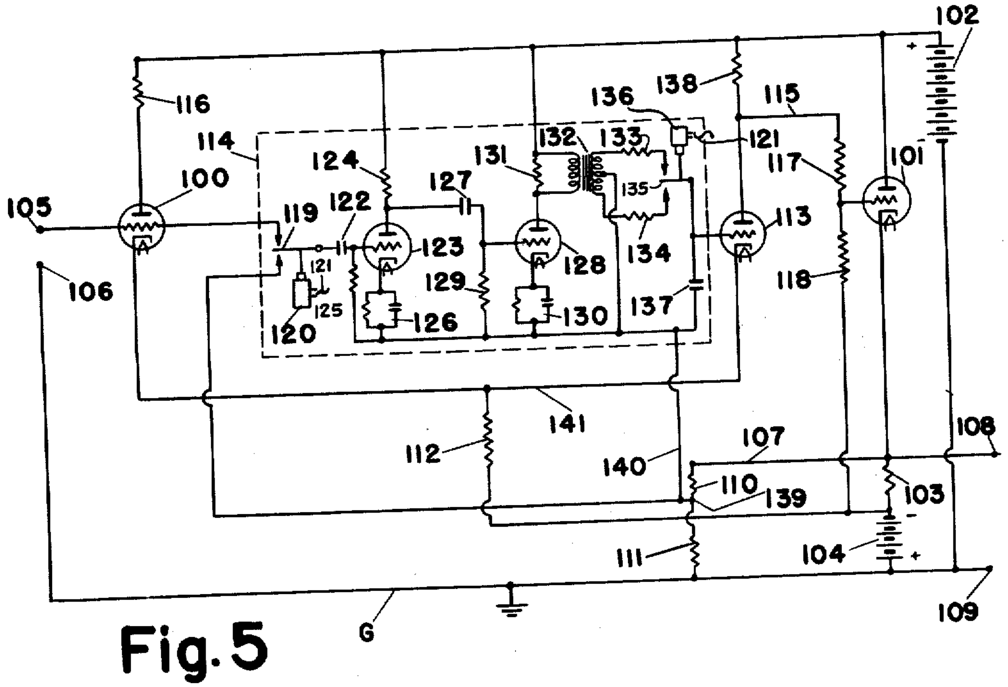
Figure 6:
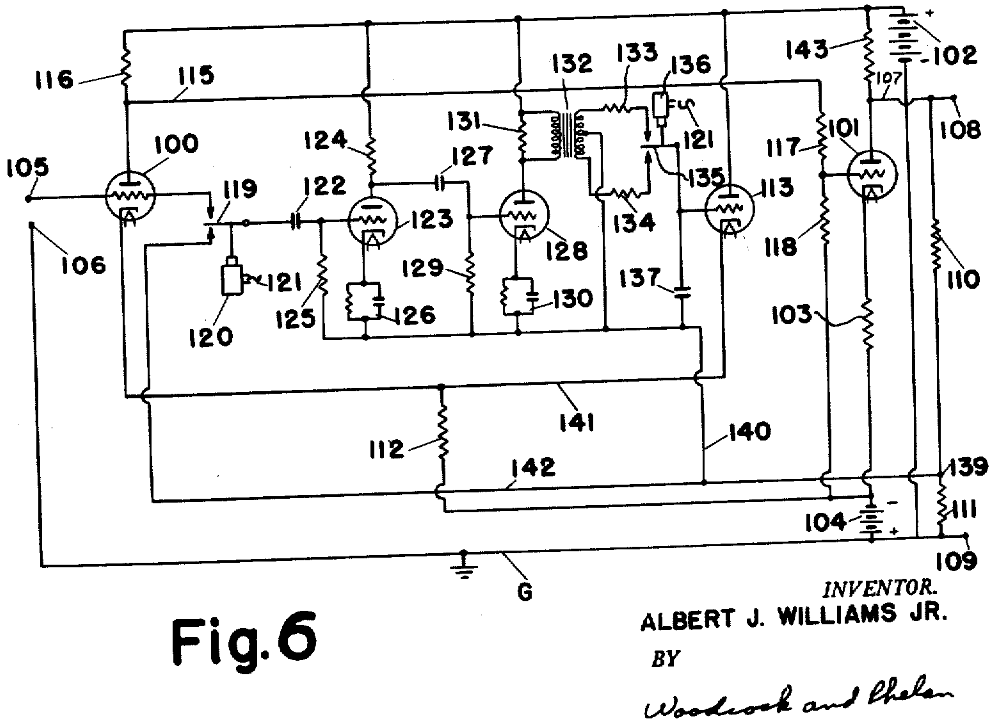

The system of the present invention lends itself to conductively-coupled amplifiers having high impedance input circuits, such a system being shown in Fig. 5 where, it will be observed, input signals applied to the input terminals 105 and 106 will be applied directly to the grid circuit of the tube 100. Signal-producing devices such as pH electrodes of high impedance may be connected directly to the input terminals.

If it be assumed that an input signal makes the grid of tube 100 positive with respect to ground, its current will immediately increase to increase the potential drop across the resistor 112. The increased potential difference across resistor 112 makes the cathode of tube 113 more positive with respect to ground and decreases the current flowing through the tube 113. The decreased current flow increases the potential applied to the grid of tube 101 due to the inclusion in the anode circuit of tube 113 of an anode resistor 138. The increased, or positive, signal applied to tube 101 causes an increase in its current, which also flows through the resistor 103 to increase the potential difference across it. The rise in potential makes the conductor 107 positive with respect to ground and also makes the juncture 139 between resistors 110 and 111 more positive with respect to ground. This change in potential by conductor 140 is applied through the integrating condenser 137 to the grid of tube 113, the result being to increase the current through tube 113. The increased current of tube 113 flowing through resistor 112 makes the conductor 141 more positive with respect to ground and thus, in effect, provides a negative feedback action which tends to restore the current through tube 100 to its original value, though both its grid and cathode are now above ground potential.

The requirements of high forward gain should also be met in the system of Fig. 5 in order that the negative feedback action shall be optimum. As in Fig. 3, the values of the resistances of resistor 110 and of resistor 11 will determine the net gain of the conductively-coupled amplifier and should be selected in the manner discussed in connection with Fig. 3.

In the event of zero error in the system of Fig. 5, the non-conductively coupled amplifier functions as before, and together with the integrating capacitor 137, controls the operation of tube 113 to introduce a corrective action into or adjustment of the conductively-coupled amplifier to eliminate zero error therein. Instead of comparing the potential of the grid of tube 100 with ground, as in Fig. 3, in Fig. 5 the potential of the grid of tube 100 is compared with that of the juncture 139 between resistors 110 and 111, which juncture point, with zero signal on the input terminals 105 and 106, is zero. It is to be further observed that the resistors 110 and 111 are connected across the output circuit including output terminals 108 and 109 and that the total potential difference across resistors 110 and 111 bears a fixed relation with the potential difference across resistor 111 which is compared with the input signal across input terminals 105 and 106 through the action of the vibrator 119. Further, that any variation in the predetermined ratio of the potential difference across the sum of the resistances of resistors 110 and 111 with respect to the potential difference across resistor 111 results in a corrective action which restores the foregoing ratio of input signal to output signal.

While in the previous modifications of the invention circuits of the cathode-follower type have been utilized, it is to be understood that while they are convenient, they are not essential to the present invention. For example, in Fig. 6 the invention has been shown as applied to a system in which the output signals applied between the output terminals 108 and 109 are taken from the anode circuit of the output tube 101. In order to predetermine the ratio between the input signals applied to input terminals 105 and 106 and those developed at the output terminals 108 and 109, resistors 110 and 111 are connected across the output terminals as before. As in Fig. 5, if that ratio changes, a voltage is developed between the grid of tube 100 and conductor 142 leading to the juncture 139 between resistors 110 and 111, which potential difference is applied by vibrator 119 to the tube 123, the non-conductively coupled amplifier functioning as in the case of Fig. 5 to introduce a corrective action to the conductively-coupled amplifier to return said ratio to its predetermined value.

With a signal applied to the input terminals 105 and 106 which will again be assumed to make the grid more positive with respect to ground, there will be an increase in the flow of current through tube 100 which will decrease the voltage applied by conductor 115 and resistors 117 and 118 to the grid of tube 101. The decreased current flow through tube 101, by way of resistor 143, raises the voltage of conductor 107 and of output terminal 108 with respect to ground. The increased current flow through tube 100 increases the potential difference across the resistor 112 which makes the cathode of tube 113 more positive with respect to ground to decrease the current flow through tube 113. Also, the rise in voltage at the output terminals makes the juncture 139 more positive and, by way of conductor 140 and integrating capacitor 137, makes the grid of tube 113 more positive to increase the current flow therethrough, and through resistor 112, thus in effect introducing negative feedback which, by reason of the increased potential difference across resistor 112, elevates the potential of the cathodes of tubes 100 and 113 with respect to ground and to a value approaching the increased positive potential applied to the grid of tube 100.

Figure 7:
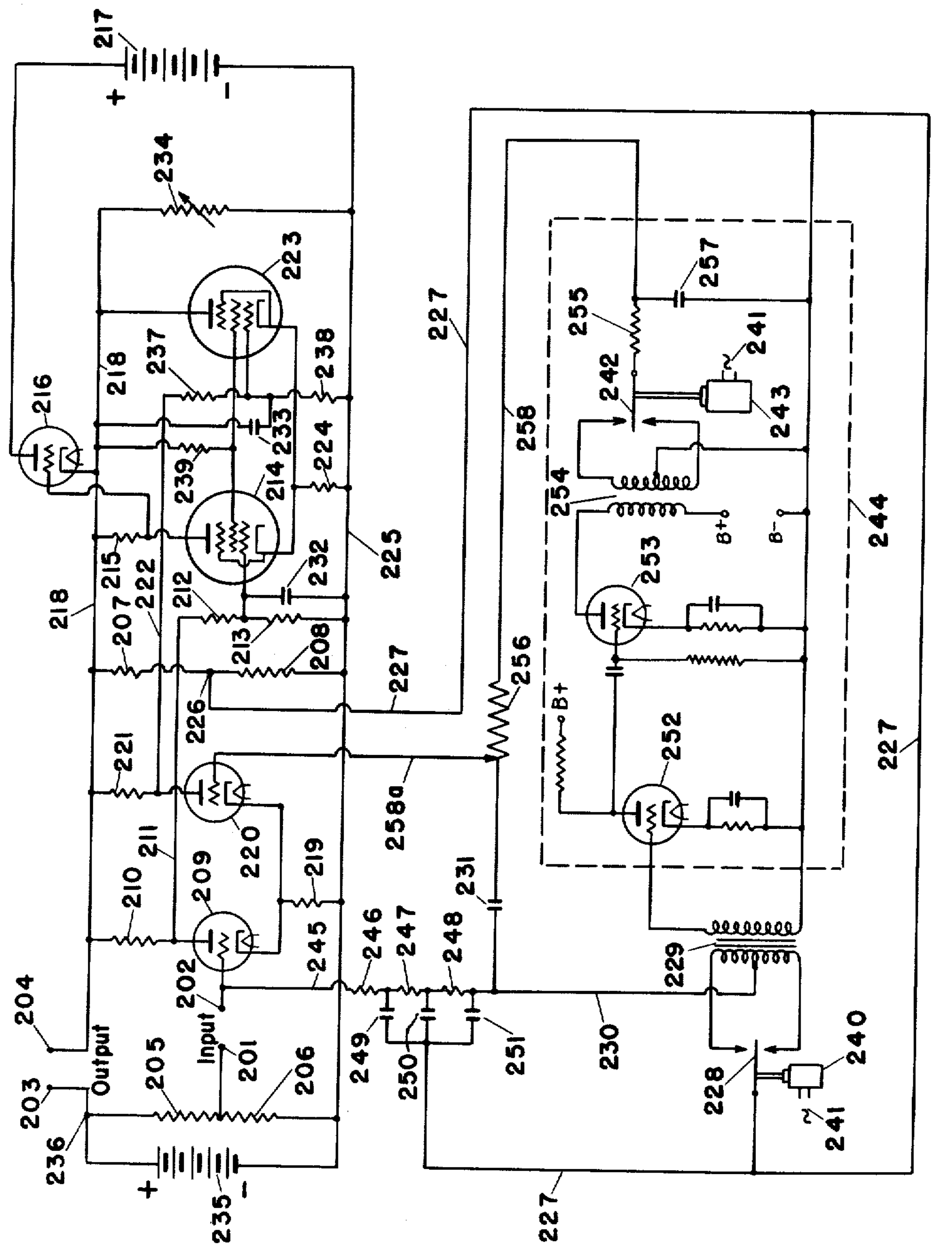

In the modification of Fig. 7 there is disclosed a system embodying the invention in which there is not utilized the common connection or common conductor between the input and output terminals of the conductively-coupled amplifier included in the previous modifications of the invention. The system of Fig. 7 includes input terminals 201 and 202 and output terminals 203 and 204. The similarity in operation with earlier forms of the invention is sufficient to warrant immediate description of the operation.

With zero input signal at the input terminals 201 and 202, and with the resistance ratio of the resistors 205 and 206 equal to the resistance ratio of resistors 207 and 208, there will be zero output signal at the terminals 203 and 204. With application of a signal to the input terminals 201 and 202, which will be assumed to make the grid of the tube 209 less negative with respect to its cathode, the current through the tube will increase, and due to the inclusion of the anode resistor 210, there will be a decrease in the potential applied by way of conductor 211 and resistors 212 and 213 to the grid of tube 214. The decrease in current flow through tube 214, having an anode resistor 215, will increase the potential applied to the grid of a tube 216 connected in series with a source of anode supply 217 and the conductor 218. The increase in current flow through tube 216 will increase the potential of the conductor 218, connected to the output terminal 204.

The increase in current flow through the tube 209 increases the potential difference across its cathode resistor 219 which raises the potential of the cathode of tube 220 to decrease the current flow therethrough. The decrease in current flow through tube 220, having anode resistor 221, increases the potential applied by way of conductor 222 to the control grid of tube 223 to increase the current flow therethrough. The tubes 214 and 223 have a common cathode resistor 224.

The decrease in current flow through the cathode resistor 224 by reason of the decrease in current through the tube 214 is substantially offset by the increase in current therethrough due to the rise in conductivity of the tube 223. The increase in potential between the conductors 218 and 225 increases the potential of the juncture 226 of resistors 207 and 208, this increase being applied by one or more paths from conductor 227 to conductor **258*a*, one being by way of capacitor 257, another through the capacitors 251 and 231, and also by way of the movable contact of vibrator 228, the respective stationary contacts of which are connected to the center tapped primary winding of transformer 229. Accordingly, that rise in potential is applied from the center tap of the primary winding by conductor 230 and the integrating capacitor 231 to the grid of tube 220** to increase the current flow therethrough.

It will be recalled that the applied signal increases the current flow through tube 209, increasing the potential difference across cathode resistor 219, the result being a decrease in current flow through the tube 220. Accordingly, the rise in potential on the grid of tube 220 increases the current flow through it and the cathode resistor 219 to raise the potential of the cathode of tube 209, the result being in the nature of negative feedback resulting from the application of the input signal to the terminals 201 and 202.

The capacitors 232 and 233 are provided for decoupling purposes to prevent oscillation and to minimize at the conductor 218 the effect of any alternating current which may be present in the anode supply of tube 216. The resistor 234 is not required and is illustrated as variable in order to provide variable loading of the tube 216 for purposes of demonstrating that the operation of the system is satisfactory with wide changes in the loading of that tube. The battery 235 need not be utilized; instead, resistors 205 and 206 may be energized from the battery 217 in a circuit from the positive terminals therefrom which includes an additional resistor. In the embodiment shown in Fig. 7, the anode supply represented by the battery 217 was approximately 400 volts, while the potential difference shown as supplied by battery 235 was approximately 105 volts. With the same anode supply the resistor connected in series with the foregoing resistors would have a value to produce the same potential across the resistors 205 and 206 as the battery 235. With the foregoing voltages, the tubes 209 and 220 were twin triodes in a single envelope of a type 6SL7 tube, while the pentodes 214 and 223 were the 6SH7 type. The tube 216 comprised four 6L6 beam power tubes connected in parallel for operation as a single tube as indicated at 216. The resistor 205 had a resistance of 8,000 ohms, while the resistor 206 had a resistance of 2,000 ohms. The resistor 207 had a resistance of 8,000 ohms, and the resistor 208 had a resistance of 2,000 ohms.

The other components of the circuit were in conformity with conventional requirements. The resistors 205, 206, 2067 and 208 were precision wire-wound resistors, while the remaining resistors were of a less expensive type, more particularly, carbon resistors with tolerance of plus or minus ten percent in resistance values. The resistors 210 and 221 were 3.3 megohms; the resistors 212 and 213, 237 and 238 were each 6.8 megohms; resistor 219 was 470,000 ohms; resistor 224, 27,000 ohms; resistor 215, 470,000 ohms; and resistor 239 in the screen grid circuit of tubes 214 and 233 was 150,000 ohms, while the capacitors 232 and 233 were each 1,000 micromicrofarads.

The vibrator 228 was of the polarized type having an operating coil 240 energized from a suitable source of alternating-current supply 241. A similar vibrator 242 has its operating coil 243 energized from the same source of supply 241 and is connected in the output circuit of the integrator 244.

In the modification of Fig. 7, the output at the terminals 203 and 204 is at all times to bear a predetermined relation with respect to the input at the terminals 201 and 202. As long as this condition is satisfied, the conductively-coupled amplifier will be operating on a predetermined characteristic curve. When there is departure from that predetermined relationship, there will be a zero error in the operation of the conductively-coupled amplifier. With the operation in the absence of a zero error, the potential at the grid of tube 209 will be equal to the potential at the point 226 between resistors 207 and 208. With a zero error a potential difference will appear between the conductor 245 connected to the grid of tube 209 and the conductor 227 connected to the juncture of resistors 207 and 208. This potential difference is applied to the input circuit of integrator 244 by way of the filter, of the low-pass type, including resistors 246—248 and capacitors 249—251, conductor 230 and primary winding of transformer 229, the circuit thereto by way of conductor 227 already having been traced. Assuming the potential at the grid of tube 209 to be higher than the potential at the point 226, then the resulting potential difference between conductors 230 and 227 will be applied to the input of the integrator. When the movable contact of the vibrator 228 engages its upper contact, current will flow upwardly from the center tap of the primary winding of transformer 229. When the contact of vibrator 228 engages the lower contact, current will flow downwardly from the center tap of the primary winding. Thus, the vibrator 228 and transformer 229 comprise a full-wave modulator to provide full-wave modulation of the error signal for the chopper amplifier 244. Similarly, the output transformer 254 and vibrator 242 comprise a full-wave rectifier for full-wave rectification of the output from the non-conductively coupled alternating current amplifier shown as including tubes 252 and 253.

The potential difference, now alternating in character, is applied by the secondary winding of transformer 229 to the first amplifying stage of the amplifier 244 which, it is to be understood, will have a plurality of stages of amplification, only two including the tubes 252 and 253 being shown. The amplifier includes in the output circuit a transformer 254, the rectifying vibrator 242, and a filter of the low-pass type, including resistors 255 and 256 and capacitor 257. The rectified output is applied by way of conductors 258 and **258*a* to the grid of the tube 220**.

If the change in the input-output relationship be due to an effect which makes the conductor 218 less positive than it should be in accordance with that predetermined relationship, the immediate effect will be the lowering of the potential of the conductor 227 with respect to the conductor 245. Accordingly, there will be applied to the tube 252 an alternating current of such phase that the rectified output thereof will apply, by conductor 258, to the grid of tube 220 a potential of polarity negative with respect to conductor 227, thus decreasing the current through tube 220. This, in turn, decreases the potential difference across cathode resistor 219, decreasing the potential of the cathode of tube 209 relative to its grid to increase the current therethrough. That increase decreases the potential applied by way of conductor 211 to the control grid of tube 214 to decrease the current therethrough, the result of which is an increase of the potential applied to the grid of tube 216. The resulting increased flow of current through tube 216 increases the potential of conductor 218 by an amount to compensate for the rise due to the assumed variation in the relationship between the input and the output of the conductively-coupled amplifier. It may be here observed that the result of a decreased flow of current through the tube 220, as reflected by an increased potential applied to the control grid of tube 223 by way of conductor 222, also results in the same corrective action or adjustment as that described.

The integrating effect present in the corrective action just described will now be explained. It will be assumed that there is a potential difference of direction or polarity which makes the conductor 245 positive with respect to the conductor 227. This potential difference is amplified by the amplifier 244, rectified in proper phase, as above described, and is fed back to the input of the amplifier by way of integrating capacitor 231. The phase is such that the potential difference which is fed back tends to reduce to zero the potential difference between the conductors 227 and 230. The voltage is not actually reduced to zero, but the gain of the amplifier is high enough so that its departure from zero is negligible.

In order to reduce the potential difference between conductors 227 and 230 to approximately zero, there must be current flow through the resistors 246—248 and through the capacitor 231 of magnitude such that the voltage drop or potential difference across the resistors 246—248 equals the potential difference between conductors 227 and 245. If it be assumed that the potential difference between conductors 245 and 227 is constant, then the voltage across the capacitor 231 must be changing at a constant time rate in order for the necessary constant current to flow through resistors 246—248. This occurs, and consequently the potential difference between the conductors 227 and 258 is essentially proportional to the time integral of the voltage across the conductors 245 and 227. Stated differently, the potential difference between conductors 227 and 245 is equal to the rate of change of voltage between conductors 227 and **258*a* multiplied by the capacitance of capacitor 231 and the total series resistance of resistors 246—248. This means that the potential difference between conductors 227 and 258 is equal to the reciprocal of the product of the capacitance of capacitor 231 and the total series resistance of resistors 246—248 multiplied by the time integral of the potential difference between conductors 227 and 245. It is to be further observed that the conductor 227 is common both to the input and output circuits of the integrator. Further, that when the conductor 245 is made positive with respect to the conductor 227, the conductor 258*a* is made negative with respect to conductor 227**.

From a consideration of the foregoing description of the operation of the integrator, it will be observed that its operation is independent of variations in anode supply, and the like, and that its operation is dependent only upon the capacitance of the capacitor 231 and the total series resistance of resistors 246—248. Accordingly, the integrator of Fig. 7 may be considered advantageous and in many cases will be preferred over those earlier described.

The system as a whole functions to maintain the conductively-coupled amplifier on a predetermined characteristic curve regardless of variations in anode supply, variations in filament supply, temperature-resistance changes in the carbon resistors in the circuit, variations in operating characteristics of the tubes, and thermal voltages in the circuits. Additionally, the conductively-coupled amplifier operates on a predetermined characteristic curve with substantial change in the loading of the tube 216 as in event of change in the value of resistor 234, or as the result of change in the voltage of the battery 235, or as the result of change in the anode supply 217. The net result is that conductively-coupled amplifiers may now be made available with superior operating characteristics, though constructed with components of less precision than have heretofore been deemed possible for use in such applications.

As an example of the degree to which the system will automatically correct the operation of the conductively-coupled amplifier to maintain it on a predetermined characteristic curve of operation, a twin-triode tube of the 12AX7 type has been substituted for the tubes 209 and 220 in a 6SL7 twin triode. Thus, a tube having quite dissimilar characteristics may be substituted one for the other, and the amplifier will operate in accordance with a predetermined characteristic curve without adjustment of, or changes in, circuit components.

It will be observed that in Fig. 7 the conductor **258*a* includes an adjustable tap which has been shown entirely to the left of resistor 256. If the tap be moved to the right along resistor 256**, there will be introduced into the system a proportional correction over and above the integral action which has previously been described. Accordingly, the adjustment of the conductively-coupled amplifier may be either in accordance with the time integral of the zero error, or in accordance with a proportional action plus an integral action.

It is to be understood that the principles underlying the invention may be applied to forms of the invention other than the modifications which have been above described bearing in mind that there have been disclosed a number of systems in which there is established in a circuit or at a point in the system, or otherwise, a basis of comparison between the input signal and a predetermined fraction of the output signal, deviation therefrom resulting in an indication of the presence of zero error or of a disturbance producing on the amplifier an effect the same as zero error.

In each case the system includes means to adjust the main amplifier so that there will be maintained a predetermined relation between the output signal and the input signal without interruption in the operation of the main amplifier, and because of drift in operating characteristics or introduction into the system at any point of a spurious signal which has heretofore been referred to as due to or causing zero error. The deviation in the ratio of the input signal to a fraction of the output signal as established in a circuit, or otherwise, is utilized for adjustment of the operation of the main amplifier without interruption of its normal functioning to return that ratio to its predetermined value in correction of or compensation for the drift or for introduction of the spurious signal.

In the form of the invention as shown in Fig. 7, with but moderate gain for the amplifier, a response time was determined as less than five-thousandths of a second in contrast with the response time of recorders with contact-modulated pre-amplifiers of approximately one second. It may, therefore, be said that in accordance with the present invention the response time of the recorder with a pre-amplifier has been reduced by a factor of 200 and, hence, the band width has been increased by a factor of 200. The foregoing factors may be greater or less than 200 depending upon the quality of the amplifiers to which the invention may be applied, the factor of 200 being realized in a typical application of the invention.

As applied to a recorder, such as the contact-modulated amplifier type of recorder shown in my Patent 2,113,164, there is a substantial and significant gain due to the reduced response time in the pre-amplifier. For such a high speed recorder, the markers or indicators may be moved rapidly enough to take full advantage of the decreased over-all response time of the recorder with the conductively-coupled pre-amplifier. The performance of such recorders is also improved by the corresponding increase in the band width of the pre-amplifier.

While there is substantial improvement in zero error of an amplifier in systems operating with proportional control instead of with the integrator, as by opening the circuit to capacitor 231 and moving contact along resistor 256 to the right as appearing in Fig. 7, such integrator is included in each preferred form of the invention.

In the absence of all corrective action, a variation in heater voltage of the tube 220 of plus or minus ten percent, produced a change in the output by as much as 1.6 volts. With the contact-modulated amplifier and integrator operative, Fig. 7, the output voltage changed by only three-hundredths of a volt, a reduction of fifty to one, and after about ten seconds the output disturbance vanished entirely. The foregoing results were on the basis of a sudden change of plus or minus ten percent in the rated voltage of the heater of tube 220. For changes in the rated voltage of the heater of tube 220 at the rate of twenty percent per minute (with a total change of plus or minus ten percent), there was a negligible change of the output voltage, the effect of change on the output by the change in the heater voltage being reduced by a factor of several hundred. The change was less than five-thousandths of a volt or as referred to the input of the amplifier, less than one-thousandth of a volt.

In accordance with the foregoing concept of the invention, it will be seen that it may be applied to other than amplifiers of the conductively-coupled type. For example, if a non-conductively coupled type of amplifier be utilized in connection with an input circuit including a photoelectric cell responsive to change in the intensity of light directed thereto, it will be understood that a source of zero error could reside in a change in the intensity of the light falling on the photocell due to ambient illumination. For example, in Fig. 8, there is shown a photocell 850 arranged to receive light, the magnitude of which is varied by deflection of the mirror 851 of a galvanometer 852, the light coming from a suitable source such as the lamp 853. The photocell 850, in conjunction with a suitable source of direct current such as a battery 854, forms an amplifier for amplification of signals applied to input terminals 855 and 856, such input signals being applied to the galvanometer through a circuit which includes a conductor 857, the upper suspension of the galvanometer, the galvanometer coil, the lower suspension, the output circuit of an amplifier 858, a resistor 859, and conductor 860. If an input signal is applied with a polarity such as to make the input terminal 856 positive with respect to the terminal 855, the galvanometer 852 will deflect in such a direction that the mirror 851 will increase the amount of light on the photocell 850. This will produce an increase in current through its output circuit including the resistor 859 and a resistor 861, thus producing across the output terminals 862 and 863 an output signal which has been amplified, increased, over the input signal applied to the terminals 855 and 856. The resistor 859 is, in effect, a negative feedback resistor, while the resistor 861 is included to provide the desired voltage gain for the amplifier.

Figure 8:
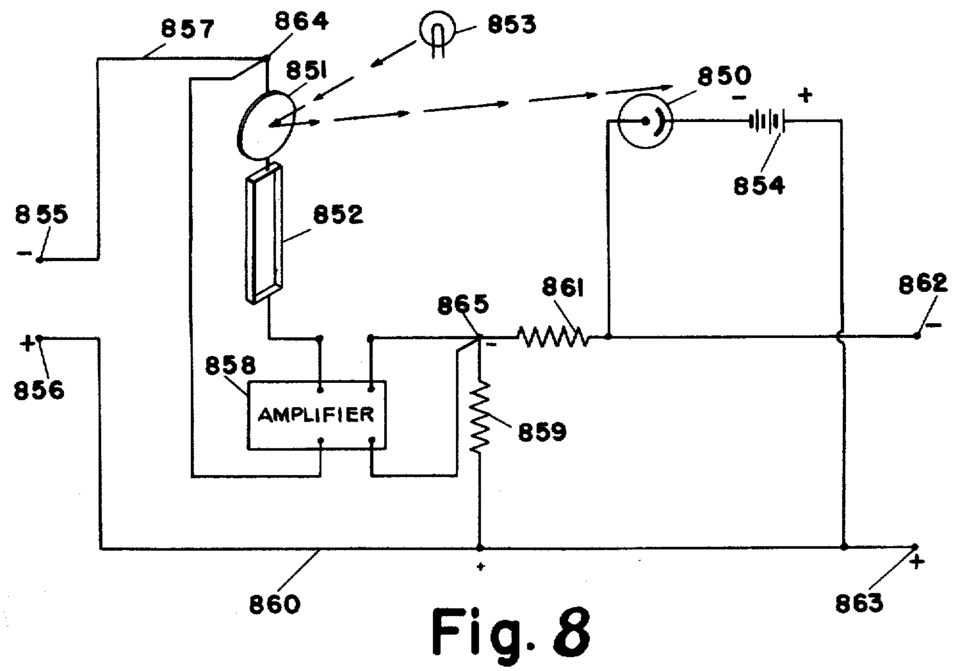

Should extraneous light fall upon the photocell 850, it will be obvious that an output current will flow which will produce an output at the terminals 862 and 863 not due to an input signal at the input terminals. However, in accordance with the present invention there is established in the circuit as between the points 864 and 865 a predetermined relationship between the input signal and a predetermined fraction of the output signal for normal operation. If the foregoing ratio changes, during normal operation of the amplifier, an input signal will be applied to the amplifier 858, which may be of any of the types previously described, the output thereof being a unidirectional voltage introduced into the circuit of the galvanometer 852 with a polarity to produce a galvanometer deflection in a direction to compensate for the error caused by the extraneous light on the photocell 850. While a single effect, that of extraneous light, has been referred to, it will be understood that the system of Fig. 8, as in the earlier modifications, will make corrections for errors or spurious conditions of other character. Accordingly, the system of Fig. 8 illustrates a type of amplifier which is not necessarily under the category of the conductively-coupled type and yet is illustrative of one to which the invention may be applied.

In several of the preceding modifications of the invention, it will be recalled that the input and output terminals were connected to a common grounded conductor. In some applications, an amplifier in which that common ground connection may be utilized may not be suitable, as for example where the source of input signal is ungrounded, the signal input low, and yet the source itself may with respect to ground develop a varying potential difference disproportionately large with respect to the voltage or output applied to the input of the amplifier. Such an amplifier has been shown in Fig. 9 and there will first be presented a brief description of the manner in which the present invention has been incorporated therein.

Figure 9:
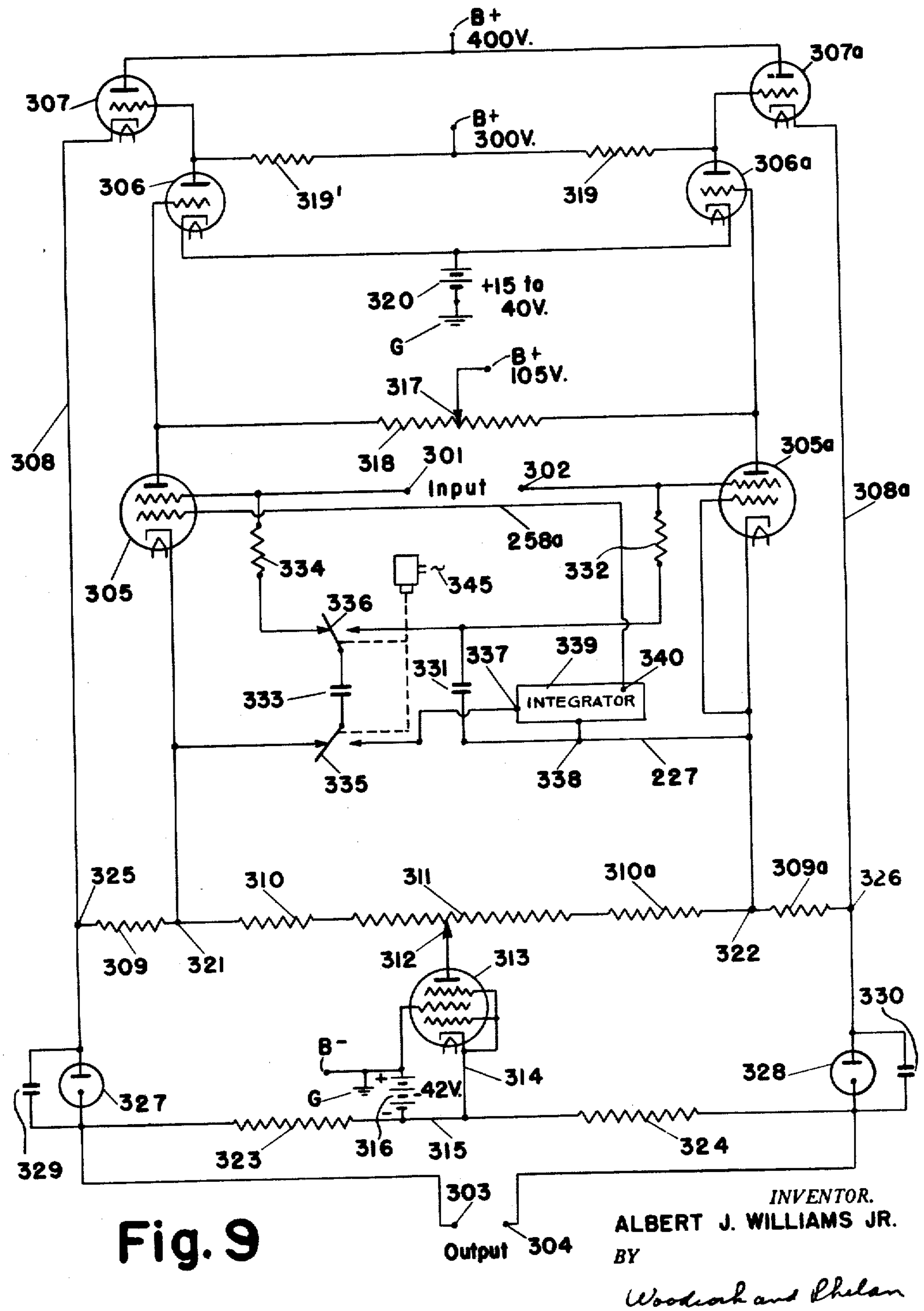

Referring to Fig. 9, there has been shown a three-stage direct or conductively-coupled differential amplifier having input terminals 301 and 302 connected to the control grids of tubes 305 and **305*a*, and output terminals 303 and 304 which, it may be assumed, may be connected to the vertical deflection plates of a cathode ray oscilloscope (not shown). It will be seen that the potential of the anode of tube 305 determines the potential of the grid of a tube 306, the anode potential of which determines the grid potential of a tube 307. This in turn determines the cathode current of the tube 307 which, passing by way of conductor 308, resistors 309 and 310, and a part of a resistor 311, a tap therefor 312, a tube 313, conductors 314, 315, a bias battery 316 of 42 volts, and thence to the ground connection G, determines the potential of the cathode of tube 305 with respect to ground. In similar manner the action of corresponding tubes 305*a*, 306*a*, 307*a*, resistors 309*a*, 310*a*, a portion of resistor 311, tube 313, bias battery 316, determines the potential of the cathode of the tube 305*a*. It may here be observed that the tap 312 is adjusted approximately equally to divide the resistor 311. Similarly, a tap 317 connected to B+ (105 volts) is adjusted substantially equally to divide the anode resistor 318 for the tubes 305 and 305*a***.

The anodes of tubes 307 and **307*a* are connected to B+ (400 volts) while the anodes of tubes 306 and 306*a* are connected to B+ (300 volts) through the respective anode resistors 319' and 319. The cathodes of tubes 306, 306*a* are connected through a cathode battery 320 to ground, while the cathodes of tubes 305 and 305*a* are connected to the junctures 321 and 322 respectively between resistors 309 and 310 and 309*a* and 310*a*. Resistors 323 and 324 are connected across the output terminals 303 and 304 with a common connection including the conductor 315 and the conductor 314 leading to the cathode of tube 313**.

In order that the potential of output terminals 303 and 304 shall follow the potentials of points 325 and 326 and be zero for zero input, and in order that the potentials of the output terminals shall be substantially at ground potential with zero input, there are included in the circuit of conductors 308 and 308a voltage regulators comprising gas discharge tubes 327 and 328 preferably shunted by capacitors 329 and 330 to decrease the impedance for a rapidly changing current as well as for currents of the higher frequencies. A part of the current path through the regulating tubes 327 and 328 includes the resistors 323 and 324.

With zero signal input, the potentials of the cathodes of tubes 305 and 305a are approximately equal. Their magnitudes with respect to ground may be adjusted to suitable values by adjustment of the common cathode battery 320 of tubes 306 and 306a. The current path for the cathode currents of tubes 307 and 307a has already been described. As a consequence of the corresponding voltage drops across the resistors in each of said current paths, points 325 and 326 have potentials which are approximately equal but which normally are well above that of ground. If the points 325 and 326 are not at the same potential there will be an output voltage applied to the output terminals 303 and 304, this voltage being applied through the voltage regulators 327 and 328 and thus, when the output terminals are connected to the oscilloscope there will be departure of the electron beam from a neutral or normally centered position.

With the input terminals 301 and 302 connected to ground, (for zero input) the potentials of points 325 and 326 are made exactly equal by adjustment of the tap 312 of resistor 311 to insure the centering of the electron beam with respect to its associated screen.

If upon application to the ungrounded input terminals 301 and 302 of potentials which raise them by exactly the same amount, there is produced a potential difference between the output terminals 303 and 304, the tap 317 of resistor 318 is adjusted until the output potential difference is reduced to zero. The amplifier will then be in adjustment for normal operation.

In explanation of normal operation, it will now be assumed that the input signal is applied in a direction such that the potential of the input terminal 301 increases while that of input terminal 302 decreases. The current through the tube 305 will increase while that through tube 305a will decrease. In a manner analogous to that of earlier modifications of the invention, the potentials of the grids of tubes 306 and 306a will decrease and increase respectively. The grids of tubes 307 and 307a will respectively increase and decrease in potential and the currents through them will respectively increase and decrease. The increased cathode current of tube 307 flowing through the path previously described will cause an increase in the potential difference between points 325 and 312. The decreased cathode current of tube 307a, in similar manner, will cause a decrease in the potential difference between points 326 and 312. The total current through the tube 313 and the potential difference thereacross remains unchanged. The increased current through the resistor 309 increases the potential of the point 321 while the decreased current through resistor 309a decreases the potential at the point 322, the increase and decrease being in the same direction as the assumed input signal applied to the grids of tubes 305 and 305a from the input terminals 301 and 302.

Accordingly, it will be seen that the potentials of points 321 and 322, corresponding in potential with the cathodes of tubes 305 and 305a, are caused to follow their respective grid potentials to a high degree. This constitutes the negative feedback for purposes of gain stabilization. The potential changes on the respective cathodes 305 and 305a will not be of exactly the same order as the potential changes produced by the application of a signal between the input terminals 301 and 302 but the changes will be approximately the same. The slight remaining difference in potential between the input terminal 301 and the point 321 and between input terminal 302 and the point 322, will occur because there is only a finite forward gain (in contrast with an infinite gain) in the amplifying paths through the tubes 305, 306, 307 and 305a, 306a and 307a.

It is preferable that the resistances of resistors 309 and 309a shall be large as compared with the resistances between the points 321 and 312 and between the points 322 and 312 respectively in order that the potential difference between points 325 and 326 will be large compared with the potential difference between points 321 and 322 respectively. The potential difference between points 325 and 326 as well as at the output terminals 303 and 304 will be in the same direction as, and many times greater than, the potential difference impressed between the input terminals 301 and 302. Accordingly, an applied input signal will suitably operate any device connected to the output terminals, such as the oscilloscope, and in the latter case, will cause its beam to be deflected from its normal zero position by an amount proportional to and in a direction corresponding with the potential difference between input terminals 301 and 302. The deflection thereof will be independent of the absolute potentials thereof.

If with an amplifier of the type just described there should occur any zero disturbance from the causes previously discussed in detail, and which may be due to drift of component parts, thermals in the circuits, or external fields, either electrical or magnetic, the potential difference between the points 321 and 322 will no longer be equal to the potential difference between the input terminals 301 and 302; and the potential difference between the points 325 and 326, and the output terminals 303 and 304 will no longer bear the predetermined relation which should exist with respect to the input potential difference. This departure from that predetermined relation constitutes the zero error, as previously discussed.

In applying the invention to the foregoing amplifier, the departure from the predetermined relation between the input signal and a predetermined fraction of the output signal is attained without interconnecting the input and output circuits in a common circuit. With the presence of the zero error, as earlier assumed, the relationship between the potential difference between the points 321 and 322 with respect to that between the input terminals 301 and 302 will not be the same as it would have been in the absence of the zero error. It will be assumed that the potential of the point 321 will be somewhat higher than it should be with respect to the point 322, and by an amount which exceeds the potential difference between the input terminals 301 and 302. (The latter assumption is made to simplify the description which follows.) Accordingly, a capacitor 331 connected through a resistor 332 to the input terminal 302 and the grid of tube 305a will acquire a potential difference between its plates equal to that between the input terminal 302 and the point 322.

It will also be seen that a capacitor 333 connected through a resistor 334 to the input terminal 301 and the grid of tube 305 and to the point 321 will acquire a potential difference equal to that between them. The capacitor 333 is connected in the foregoing circuit by virtue of the position of the movable contacts 335 and 336 of a double-contact vibrator against their respective stationary contacts. The movable contacts 335 and 336 are alternately operated from the positions shown in contact with one set of stationary contacts into engagement with the opposite set of stationary contacts at any suitable rate, such as 60 cycles per second. When the movable contacts of the vibrator engage the other pair of stationary contacts the capacitor 333 is connected in series with the capacitor 331, the relative connections being such that the difference in potential on the capacitor 331 and the difference in potential on capacitor 333 are applied to the input terminals 337 and 338 of integrator 339.

The integrator 339 may be of the same type as described in connection with the modification of Fig. 7. More particularly, the difference in potential applied to the input terminals 337 and 338 would be applied to the input conductors 245 and 227 of Fig. 7 while the output terminals 340 and 338 of Fig. 9 would correspond with output conductors 227 and 258a of Fig. 7. Since the operation would be the same in Fig. 9 as in Fig. 7, the integrator itself has been indicated by the rectangle carrying the reference character 339. The integrator functions so that the potential difference developed between the output conductors 258a and 227 will be in a direction to change, the current flow through the tube 305 to reestablish the predetermined relationship of the potential difference between the points 325 and 326 and that between the input terminals 301 and 302.

It will be observed that in the integrator of Fig. 7 there is provided a vibrator 228 in the input circuit to convert the unidirectional current to alternating current for amplification by the amplifier 244. In Fig. 9 the double vibrator contacts 335 and 336 may be utilized for the circuit-changing functions described and the pulsating unidirectional current may be applied through suitable coupling means directly to the grid of the tube 252 of the amplifier 244, thus avoiding the need to use two vibrators in the input circuit of the integrator 339. In that case, there may not be included the feedback provision of the integrator of Fig. 7 and including the capacitor 231. Hence, the integrator may also be of the type shown in Fig. 6.

In Fig. 9 the tubes 305 and 305a may be of any suitable type having dual control grids. However, the invention may be applied to a system using tubes of different types, such as simple triodes, and as shown in the modification of Fig. 10.

Figure 10:
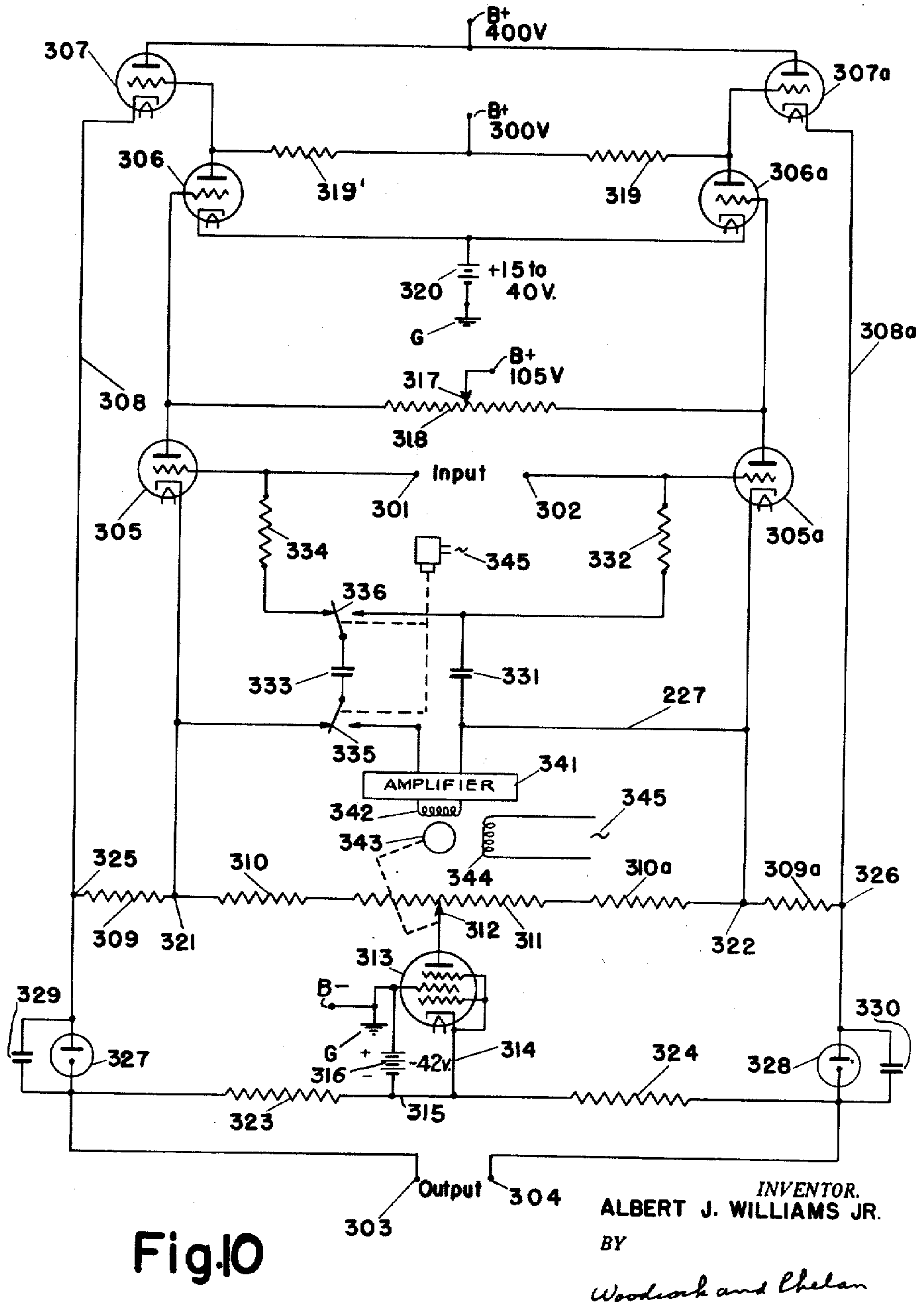

In Fig. 10 the differential amplifier is identical with Fig. 9, with the exception of the substitution of triodes 305 and 305a for the tetrodes bearing the same reference characters in Fig. 9. In Fig. 10 there is also disclosed a different type of integrator, one of the electromechanical type which, after amplification by the amplifier 341 of the voltage derived from the capacitors 333 and 331 due to the presence of a signal representing a "zero" error, is converted to alternating current, amplified, and is applied to the control winding 342 of a motor having a rotor 343 connected to adjust the tap 312 relative to the resistor 311. The power winding 344 of the motor is connected to the same alternating-current source of supply 345 as the operating coil of the double-contact vibrator. In Fig. 10, the double-contact vibrator will preferably be of the polarized type. In Fig. 10, as in the modification of Fig. 1, the motor is operated by an amount proportional to the integral with respect to time of the input voltage due to the zero error of the system applied to the amplifier, thus adjusting the contact 312 relative to the resistor 311 to reestablish the predetermined relationship between the points 325 and 326 relative to the input terminals 301 and 302, the same predetermined relationship then also existing between the input terminals and the output terminals 303 and 304.

Inasmuch as the changes in the potentials of the cathodes of each of the tubes 305 and 305a of Figs. 9 and 10 closely follow the changes in potentials of their respective grids, the potentials on capacitors 333 and 331 connected between their respective grids and cathodes will not change unless there is a change in potential of one of the cathodes with respect to its grid. Such a change results from zero error in the amplifier and, as already explained, changes the potential of points 321 and 322 which produces the change on the cathodes of tubes 305 and 305a other than that due to a variation in the potential applied to the grids thereof.

Inasmuch as the charge on each of the capacitors 331 and 333 does not change, in the absence of zero error, these capacitors when connected in opposition one to the other, do not discharge and there is avoided current drain from the grid and input circuits. The resistors 332 and 334 are provided to minimize such current drain, particularly with rapidly changing input signals, of the higher frequencies.

As in the preceding modifications of the invention, the fraction of the output signal which is compared with the input signal is preferably numerically equal to the output signal divided by the gain of the amplifier, this relationship being established by the resistance values of resistors 309, 310, 311, 310a and 309a. Resistors 309 and 309a are each 100,000 ohms, while the remaining resistors are 1000 ohms each. The gain will then be the sum of the resistances of all five resistors (203,000) divided by the sum of the resistances of resistors 310, 311 and 310a (3000). Hence, the gain would be of the order of 67, and one-sixty-seventh of the output signal will be compared with the input signal by the use of the capacitors 331 and 333 in manner already described.

The present application is a continuation-in-part of my application, Serial No. 82,302, filed March 19, 1949, now abandoned, for "System for Adjusting Amplifiers to Compensate for Drift and/or Zero-Error."

The application of the invention to recorder applications is to be taken as illustrative of the improvements in operation due to the use of the direct-current or conductively-coupled amplifier, an application made possible by the elimination of the effect on the output of the many variables which for convenience have been referred to herein, and in the claims, as zero error.

While preferred embodiments of the invention have been described, it is to be understood further changes may be made and features of one embodiment substituted for features of other embodiments, all within the scope of the appended claims.

What is claimed is:

1. An amplifying system comprising, a direct-coupled amplifier having a control potential impressed on its input, a source of reference potential, an alternating current amplifier, means for comparing said control potential with said reference potential to obtain a difference potential, means for converting said difference potential to an alternating potential, circuit means impressing said alternating current potential on the input of said alternating current amplifier, means for rectifying the alternating current output of said alternating current amplifier to produce a direct current potential proportional to said alternating current output, and means responsive to said direct current potential for adjusting the static potential level impressed on said direct-coupled amplifier to compensate for the zero drift thereof.

2. The amplifying system of claim 1 in which said means for converting said difference potential to an alternating potential includes a switch having at least one contact movable into and out of circuit-closing relation with a cooperating contact, and means for operating said switch at a frequency of less than thirty cycles per second.

3. The amplifying system of claim 2 in which the sensitivity of said alternating-current amplifier is maintained between $1.5 \times 10^{-14}$ amperes and $10^{-15}$ amperes by operation of said converter at a frequency between 1 cycle per second and 1/15 of a cycle per second.

4. The amplifying system of claim 1 in which said converting means has an input comprising a series circuit including a high-valued resistor and a low-valued capacitor to which said difference potential is applied, and integrating means for said direct-current potential connected between said rectifying means and said adjusting means.

5. The amplifying system of claim 4 in which said means responsive to said direct-current potential includes a control element, and in which there is provided pulse-shaping means between said last-named integrating means and said control element for modifying the output of said last-named integrating means in accordance with an operating characteristic of said direct-coupled amplifier to prevent undershoot or overshoot of the corrective action introduced by said means including said control element.

6. The amplifying system of claim 5 in which said means for rectifying said alternating-current output comprises photocells operating under uniform conditions of illumination, and means in circuit with each photocell for introducing a bias for preventing the conduction of one photocell following the tranmisssion of a pulse through the other photocell to prevent application to said last-named integrating means of any signal immediately following the transmission of said one pulse through said one of said cells.

7. The amplifying system of claim 6 in which the bias-producing means for said photocells comprises diodes connected back-to-back, respectively across the output circuit of said second channel and respectively in series with said photocells, each diode being connected in its series-circuit with a polarity for development thereby of a potential difference exceeding that of the signal following the pulse developed from said first-named integrator and of polarity to prevent conduction by the photocell in whose circuit said diode is connected.

8. The amplifying system of claim 7 in which there is included in series with each of said diodes a resistor and a capacitor in shunt thereto, and a bias cell in series with said capacitor-resistor combination.

9. The amplifying system of claim 7 in which said alternating-current amplifier has a push-pull output stage connected to the winding of a transformer, said transformer having three secondary windings, one connected across said diodes, a second winding connected in circuit with one photocell and one diode circuit, and a third winding connected in circuit with the other photocell and the other diode circuit.

10. The amplifying system of claim 1 in which said means responsive to said direct-current potential includes integrating means operable at least in part in accordance with the time integral of the output of said alternating-current amplifier for making said adjustment of said static potential level impressed on said direct-coupled amplifier to compensate for said drift thereof.

11. The amplifying system of claim 1 in which said alternating-current amplifier includes integrating means for producing an output which varies substantially with the time integral of said difference potential.

12. The amplifying system of claim 1 in which said direct-coupled amplifier has means including an output circuit for producing a positive-going output signal in response to a positive-going input signal.

13. The amplifying system of claim 1 in which said means for comparing said control potential with said reference potential includes a voltage divider connected directly across the output of said direct-coupled amplifier.

14. The amplifying system of claim 1 in which said means for converting said difference potential to an alternating-current potential and said circuit means for impressing said alternating-current potential on the input of said alternating-current amplifier comprises a dual vibrator having double-pole double-throw contacts, and a storage capacitor between said double-pole contacts.

15. The amplifying system of claim 14 in which said double-throw contacts are connected in circuits for application to said capacitor first of a portion of the difference between said control potential and said reference potential and for thereafter connecting it with the remaining portion of said difference between said potentials and concurrently connecting it to the input of said alternating-current amplifier.

16. The amplifying system of claim 1 in which said alternating-current amplifier is of the type which develops trailing half-waves upon application thereto of impulses of one polarity or the other, said half-waves being of polarity opposite to the polarity of said applied pulses, said rectifying means including an output circuit having one current path for impulses of one polarity and a second current path for impulses of the opposite polarity for eliminating the trailing half-waves and for transmitting only the applied impulses, a unidirectional conductive device in each flow path and disposed therein for opposite flow of current in the respective paths, biasing means included in each of said flow paths, and means operable upon passage of a current impulse through a first one of said unidirectional devices for producing a biasing potential in the current path of the second of said unidirectional devices to prevent flow of current therein due to the half-wave which follows the impulse transmitted by said first unidirectional device.

17. The amplifying system of claim 16 in which each of said means for producing a biasing potential includes a diode, a resistor in series therewith, and a capacitor shunting said resistor.

18. The amplifying system of claim 17 in which a transformer is provided having a primary winding connected to said alternating current amplifier, a secondary winding for each of said flow paths and a secondary winding connected to said diodes, one side of said last-named secondary winding being connected to the cathode of one diode and the anode of the other diode.

19. The amplifying system of claim 16 in which said unidirectional devices each comprises a photocell and a source of illumination therefor for maintaining low the resistance to current flow in one direction, each photocell having a high resistance to current flow in the opposite direction.

20. The amplifying system of claim 1 in which said alternating current amplifier is of the type which develops trailing half-waves upon application thereto of impulses of one polarity or the other, said rectifying means including an output circuit having one current path for impulses of one polarity and a second current path for impulses of the opposite polarity for eliminating the trailing half-waves and for transmitting only the applied impulses, unidirectional conductive means in each of said flow paths and respectively connected therein for flow of current in one path in one direction and for flow of current in the other path in the opposite direction, biasing means included in each of said flow paths for preventing flow of current through the unidirectional conductive means therein when the amplitude thereof is below a value established by said biasing means, said alternating current amplifier including at least two stages coupled together in cascade, and circuit elements in said stages providing a time constant in the stage more removed from said unidirectional conductive means materially greater than the time constant of the stage less remote from said unidirectional conductive means.

21. The amplifying system of claim 20 in which the time constant of the stage more remote from said unidirectional conductive means is of the order of fifty times that of the stage less remote from said unidirectional conductive means.

22. The amplifying system of claim 20 in which the time constant of a stage more remote from said unidirectional conductive means is of the order of five seconds and the time constant of the stage less remote from said unidirectional conductive means is of the order of one-tenth of a second.

23. The amplifying system of claim 1 in which said comparing means includes low-pass filtering means.

24. The amplifying system of claim 1 in which said comparing means includes low-pass filtering means, and said means for adjusting said static potential level including a low-pass filtering means.

25. An amplifying system comprising, a direct-coupled amplifier adapted to have a control signal potential impressed on its input, means coupled to the output of said direct-coupled amplifier for deriving from the output thereof a signal potential whose amplitude is equal to the output signal of said direct-coupled amplifier divided by the gain thereof, means for comparing said control signal with the derived portion of said output signal to produce a difference signal, means for amplifying said difference signal, and means operative in accordance with the amplified difference signal for controlling the static potential of said direct-coupled amplifier.

26. The amplifying system of claim 25 in which said direct-coupled amplifier is of the differential type having at least two tubes, the cathode current of one tube increasing for a given input signal while the cathode current of the other tube decreases, said means coupled to said output of said direct-coupled amplifier including a voltage dividing circuit for changing the cathode potential of each of said tubes in a direction to follow the potential of the grid of each of said tubes and to represent the output signal divided by the gain of said direct-coupled amplifier, said comparing means including a pair of capacitors one connected between the grid and cathode of one of said tubes and the other connected between the grid and cathode of the other of said tubes, and in which said comparing means also includes means for periodically disconnecting one of said capacitors from the grid and cathode of one of said tubes and connecting it in series with the other of said capacitors for producing said difference signal.

27. The amplifying system of claim 26 in which said means operative in accordance with said amplified difference signal includes an integrator for applying to a control grid of at least one of said tubes a bias of polarity and magnitude for said control of said static potential of said direct-coupled amplifier.

28. The amplifying system of claim 25 in which said means operative in accordance with said amplified difference signal includes an electric motor and a resistor included in at least one control circuit of said direct-coupled amplifier adjusted by said motor.

29. The amplifying system of claim 26 in which said means operative in accordance with said amplified difference signal includes an electromechanical integrator and a cathode resistor having one part in the cathode circuit of one of said tubes and another part in the cathode circuit of the other of said tubes, said electromechanical integrator being effective upon actuation thereof to adjust the relative proportions of said resistor in said respective cathode circuits.

30. The amplifying system of claim 25 in which said direct-coupled amplifier has at least one differential amplifier stage provided with input means for application thereto of said control signal.

31. The amplifying system of claim 1 in which said means for converting said difference potential to an alternating current potential is a full-wave modulator, and in which said means for rectifying said alternating current output is a full-wave rectifier.

32. The amplifying system of claim 25 in which said direct-coupled amplifier has at least one differential amplifier stage, said means coupled to the output of said direct-coupled amplifier including a voltage-dividing network, and in which said means for amplifying said difference signal includes a non-conductively coupled amplifier of the chopper type.

33. The amplifying system of claim 25 in which said direct-coupled amplifier has at least one differential amplifier stage provided with input means for application thereto of said control signal and in which said means operative in accordance with said amplified difference signal includes an electric motor and a resistor included in at least one control circuit of said direct-coupled amplifier adjusted by said motor.

References Cited in the file of this patent

UNITED STATES PATENTS

| | | |
|---|---|---|
| 2,297,543 | Eberhardt | Sept. 29, 1942 |
| 2,516,865 | Ginzton | Aug. 1, 1950 |
| 2,554,132 | Van Zelst | May 22, 1951 |

FOREIGN PATENTS

| | | |
|---|---|---|
| 620,140 | Great Britain | Mar. 21, 1949 |

UNITED STATES PATENT OFFICE
CERTIFICATE OF CORRECTION

Patent No. 2,919,409 December 29, 1959

Albert J. Williams, Jr.

It is hereby certified that error appears in the printed specification of the above numbered patent requiring correction and that the said Letters Patent should read as corrected below.

Column 1, line 49, for "circuit-carrying" read -- circuit-varying --; column 4, line 46, for "the", second occurrence, read -- for --; column 9, line 75, for "non-conductivity" read -- non-conductively --; column 15, line 22, for "547" read -- 457 --; column 24, line 10, for "2067" read -- 207 --; line 40, column 27, after "of a volt." insert the following paragraph -

> It is to be understood that the foregoing changes in the heater voltage are to be taken as representative of other sources of zero error for which compensation or correction is made in accordance with several forms of the invention.

Signed and sealed this 14th day of June 1960.

(SEAL)
Attest:
KARL H. AXLINE
Attesting Officer

ROBERT C. WATSON
Commissioner of Patents